US012794578B2

(12) United States Patent
Choi

(10) Patent No.: US 12,794,578 B2

(45) Date of Patent: Nov. 10, 2026

(54) ELECTRONIC DEVICE FOR PERFORMING OPERATION BASED ON LATENCY OF PLURALITY OF LINKS, AND OPERATION METHOD OF ELECTRONIC DEVICE

(71) Applicant: SAMSUNG ELECTRONICS CO., LTD., Suwon-si (KR)

(72) Inventor: Junsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 19/020,410

(22) Filed: Jan. 14, 2025

(65) Prior Publication Data

US 2025/0150184 A1 May 8, 2025

Related U.S. Application Data

(63) Continuation of application No. PCT/KR2023/009126, filed on Jun. 29, 2023.

(30) Foreign Application Priority Data

Jul. 18, 2022 (KR) ........................ 10-2022-0088529
Aug. 18, 2022 (KR) ........................ 10-2022-0103492

(51) Int. Cl.

*H04B 17/364* (2015.01)
*H04W 24/08* (2009.01)
*H04W 76/15* (2018.01)

(52) U.S. Cl.

CPC .......... *H04B 17/364* (2015.01); *H04W 24/08* (2013.01); *H04W 76/15* (2018.02)

(58) Field of Classification Search

CPC .... H04B 17/364; H04W 24/08; H04W 76/15; H04W 76/27; H04W 84/12

See application file for complete search history.

(56) References Cited

U.S. PATENT DOCUMENTS 7,917,113 B2 3/2011 Palenius et al.
9,942,010 B1 4/2018 Chu et al.
(Continued)

FOREIGN PATENT DOCUMENTS

CN 113543243 A 10/2021
CN 114125992 A 3/2022
(Continued)

OTHER PUBLICATIONS

International Search Report (PCT/ISA/210) issued Oct. 5, 2023 by the International Searching Authority in International Application No. PCt/KR2023/009126.

(Continued)

*Primary Examiner* — David B Lugo

(74) *Attorney, Agent, or Firm* — Sughrue Mion, PLLC

(57) ABSTRACT

An electronic device may include: a communication circuit configured to transmit or receive data through a plurality of links including a first link between a first access point (AP) and the electronic device; at least one processor operatively connected to the communication circuit; and memory storing instructions that, when executed by the at least one processor, cause the at least one processor to: determine a contention time corresponding to a waiting time for data transmission, based on a predetermined number of counters and a ratio between a time during which the first link exists in an idle state and a time for subtracting the counters allocated to the electronic device during one communication period; determine a latency for transmitting data through the first link, based on the contention time and a transmission time for transmitting the data; and perform at least one operation, based on the latency.

20 Claims, 15 Drawing Sheets

1200

(56) References Cited

U.S. PATENT DOCUMENTS

| | | | |
|---|---|---|---|
| 10,750,539 B2 | 8/2020 | Hu et al. | |
| 10,757,664 B2 | 8/2020 | Bhorkar et al. | |
| 11,665,264 B2 | 5/2023 | Li et al. | |
| 11,930,408 B2 | 3/2024 | You et al. | |
| 12,556,470 B2 * | 2/2026 | Narula | H04L 43/02 |
| 2018/0113965 A1 | 4/2018 | Harris et al. | |
| 2021/0014776 A1 | 1/2021 | Patil et al. | |
| 2022/0086698 A1 | 3/2022 | Yao et al. | |
| 2022/0124855 A1 | 4/2022 | Hu et al. | |
| 2022/0132572 A1 | 4/2022 | Fang et al. | |
| 2022/0337338 A1 * | 10/2022 | Homchaudhuri | H04B 7/024 |
| 2023/0046270 A1 | 2/2023 | Huang et al. | |
| 2023/0114284 A1 | 4/2023 | Kim et al. | |

FOREIGN PATENT DOCUMENTS

| | | |
|---|---|---|
| EP | 4 199 598 A1 | 6/2023 |
| JP | 2018-519692 A | 7/2018 |
| KR | 10-2018-0109856 A | 10/2018 |
| KR | 10-2021-0119297 A | 10/2021 |
| KR | 10-2022-0024738 A | 3/2022 |

OTHER PUBLICATIONS

Written Opinion (PCT/ISA/237) issued Oct. 5, 2023 by the International Searching Authority in International Application No. PCt/KR2023/009126.

Khorov et al., "Current Status and Directions of IEEE 802.11be, the Future Wi-Fi 7", IEEE Access, 2020, vol. 8, pp. 88664-88688 (25 pages total).

Hsu, "Link Latency Statistics of Multi-band Operations in EHT", IEEE 802.11-20/0105r4, 2020, pp. 1-15 (15 pages total).

Seok, "RTS and CTS Procedure in Synchronous Multi-link Operation", IEEE 802.11-20/0577r0, 2020, pp. 1-20 (20 pages total).

Extended European Search Report dated Sep. 9, 2025, issued by the European Patent Office in European Application No. 23843207.4.

* cited by examiner

ELECTRONIC DEVICE FOR PERFORMING OPERATION BASED ON LATENCY OF PLURALITY OF LINKS, AND OPERATION METHOD OF ELECTRONIC DEVICE

CROSS-REFERENCE TO RELATED APPLICATIONS

This application is a continuation application of International Application No. PCT/KR2023/009126, filed on Jun. 29, 2023, in the Korean Intellectual Property Receiving Office, which claims priority to Korean Patent Application No. 10-2022-0088529, filed on Jul. 18, 2022, in the Korean Intellectual Property Office, and Korean Patent Application No. 10-2022-0103492, filed on Aug. 18, 2022, in the Korean Intellectual Property Office, the disclosures of which are incorporated by reference herein in their entireties.

BACKGROUND

1. Field

Various embodiments of the disclosure relate to an electronic device and a method of operating an electronic device, and a technology for performing an operation based on latency of a plurality of links.

2. Description of Related Art

With the supply of various electronic devices, a speed of wireless communication which can be used by the various electronic devices has been improved. Among types of wireless communication supported by recent electronic devices, IEEE 802.11 WLAN (or Wi-Fi) is the standard for implementing high-speed wireless connections between various electronic devices. First implemented Wi-Fi supported a maximum of transmission speed of 1 to 9 Mbps, but Wi-Fi 6 technology (or IEEE 802.11 ax) may support a maximum of transmission speed of about 10 Gbps.

The electronic device may support various services (for example, a UHD video streaming service, an augmented reality (AR) service, a virtual reality (VR) service, or a mixed reality (MR) service) using relatively large data through wireless communication supporting a high transmission speed and also support various other services.

In the IEEE 802.11 WLAN standard, it is planned to introduce technology supporting multi-link operation (MLO) in order to improve the data transmission and reception speed and reduce latency. Electronic devices supporting the multi-link operation may transmit or receive data through a plurality of links, and thus it is expected to implement a relatively high transmission speed and low latency.

The electronic device may use a carrier sense multiple access with collision avoidance (CSMA/CA) scheme to prevent a situation where collision occurs due to simultaneous transmission of data with other electronic devices through the same link in the WLAN system. The CSMA/CA scheme is a scheme for transmitting data when a specific link is in an idle state, and the electronic device supporting CSMA/CA may identify whether another electronic device transmits data through the specific link and when the other electronic device does not transmit data through the specific link, may transmit data. The electronic device supporting the multi-link operation may transmit data through the CSMA/CA scheme in each of the plurality of links.

SUMMARY

An electronic device may identity latency of a plurality of links for various purposes. The electronic device may control the plurality of links, based on latency of each of the plurality of links or may switch the currently connected AP to another AP in order to meet sufficient quality for a service performed by the electronic device. Accordingly, the electronic device may accurately determine (or predict) latency of the plurality of links.

The latency may include a contention time corresponding to a time during which electronic devices contend for data transmission through a CSMA/CA scheme and a transmission time corresponding to a time for actually transmitting data by the electronic device. Particularly, the contention time may vary depending on utilization of links by other electronic devices which occupy the links or can occupy the links, and thus the accurate prediction may be difficult.

The technical subjects pursued in the disclosure are not limited to the above mentioned technical subjects, and other technical subjects which are not mentioned may be clearly understood through the following descriptions by those skilled in the art of the disclosure.

According to one or more example embodiments, an electronic device may include: a communication circuit configured to transmit or receive data through a plurality of links including a first link between a first access point (AP) and the electronic device; at least one processor operatively connected to the communication circuit; and memory storing instructions that, when executed by the at least one processor, cause the at least one processor to: determine a contention time corresponding to a waiting time for data transmission, based on a predetermined number of counters and a ratio between a time during which the first link exists in an idle state and a time for subtracting the counters allocated to the electronic device during one communication period; determine a latency for transmitting data through the first link, based on the contention time and a transmission time for transmitting the data; and perform at least one operation, based on the latency.

According to one or more example embodiments, A method of operating an electronic device for transmitting and/or receiving data through a plurality of links including a first link, may include: determining a contention time corresponding to a waiting time for data transmission, based on a predetermined number of counters and a ratio between a time during which a first link exists in an idle state and a time for subtracting the counters allocated to the electronic device during one communication period; determining a latency for transmitting data through the first link, based on the contention time and a transmission time for transmitting the data through the first link; and performing at least one operation, based on the latency.

According to one or more embodiments, an electronic device may include: a communication circuit configured to transmit or receive data through a plurality of links including a first link; at least one processor operatively connected to the communication circuit; and memory storing instructions that, when executed by the at least one processor, cause the at least one processor to: determine a first time during which a state of the first link is monitored and a second time during which the first link is occupied by another electronic device; determine an idle time of the first link by subtracting the second time from the first time; determine a contention time corresponding to a waiting time for data transmission, based on a ratio between the idle time and a time for subtracting counters allocated to the electronic device during one slot;

determine a latency for transmitting data through the first link, based on the contention time and a transmission time for transmitting the data; and perform at least one operation, based on the latency.

According to an electronic device and a method of operating an electronic device according to one or more embodiments of the disclosure, it is possible to accurately determine a contention time, based on a ratio of a time for subtracting counters to be allocated to the electronic device in every predetermined unit and a time during which a link exists in an idle state, and a predetermined number of counters. Accordingly, the electronic device may determine the contention time in consideration of the counters differently configured for each electronic device participating in contention, so as to accurately determine the contention time and the latency.

According to an electronic device and a method of operating an electronic device according to various embodiments of the disclosure, it is possible to identify a combination of a plurality of links having latency equal to or shorter than latency for performing a service being performed by the electronic device. The electronic device may activate a link included in the identified combination and switch the remaining links to an inactive state. Accordingly, the electronic device may reduce power consumption of the electronic device.

According to an electronic device and a method of operating an electronic device according to various embodiments of the disclosure, it is possible to identify latency of combinations of a plurality of links and identify whether there is a combination of a plurality of links having latency equal to or shorter than latency for a communication service between devices being performed by the electronic device. When there is a combination of a plurality of links having latency equal to or shorter than latency for the communication service between devices being performed, the electronic device may transmit or receive data through an AP without activating direct communication between devices. Accordingly, the electronic device may reduce power consumption.

According to an electronic device and a method of operating an electronic device according to various embodiments of the disclosure, it is possible to identify latency of combinations of a plurality of links and identify whether there is a combination of a plurality of links having latency equal to or shorter than latency for a service being performed by the electronic device. When there is no combination of a plurality of links having latency equal to or shorter than latency for performing the service being performed, the electronic device may perform short-range wireless communication through another AP which is not the currently connected AP. Accordingly, the electronic device may improve the quality of short-range wireless communication.

The effects that can be realized by the disclosure are not limited to the above-described effects, and other effects that have not been mentioned may be clearly understood by those skilled in the art from the following description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
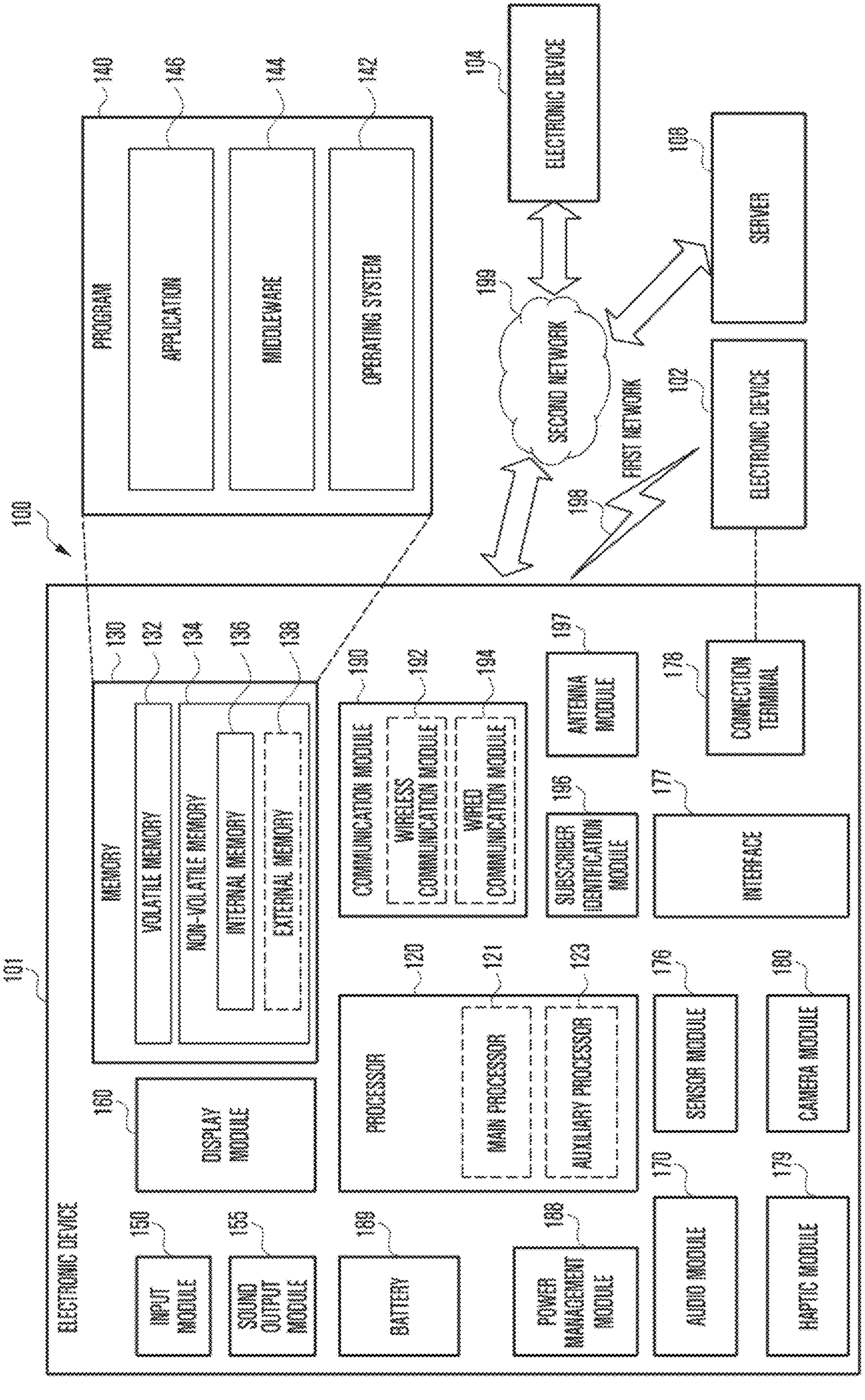
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
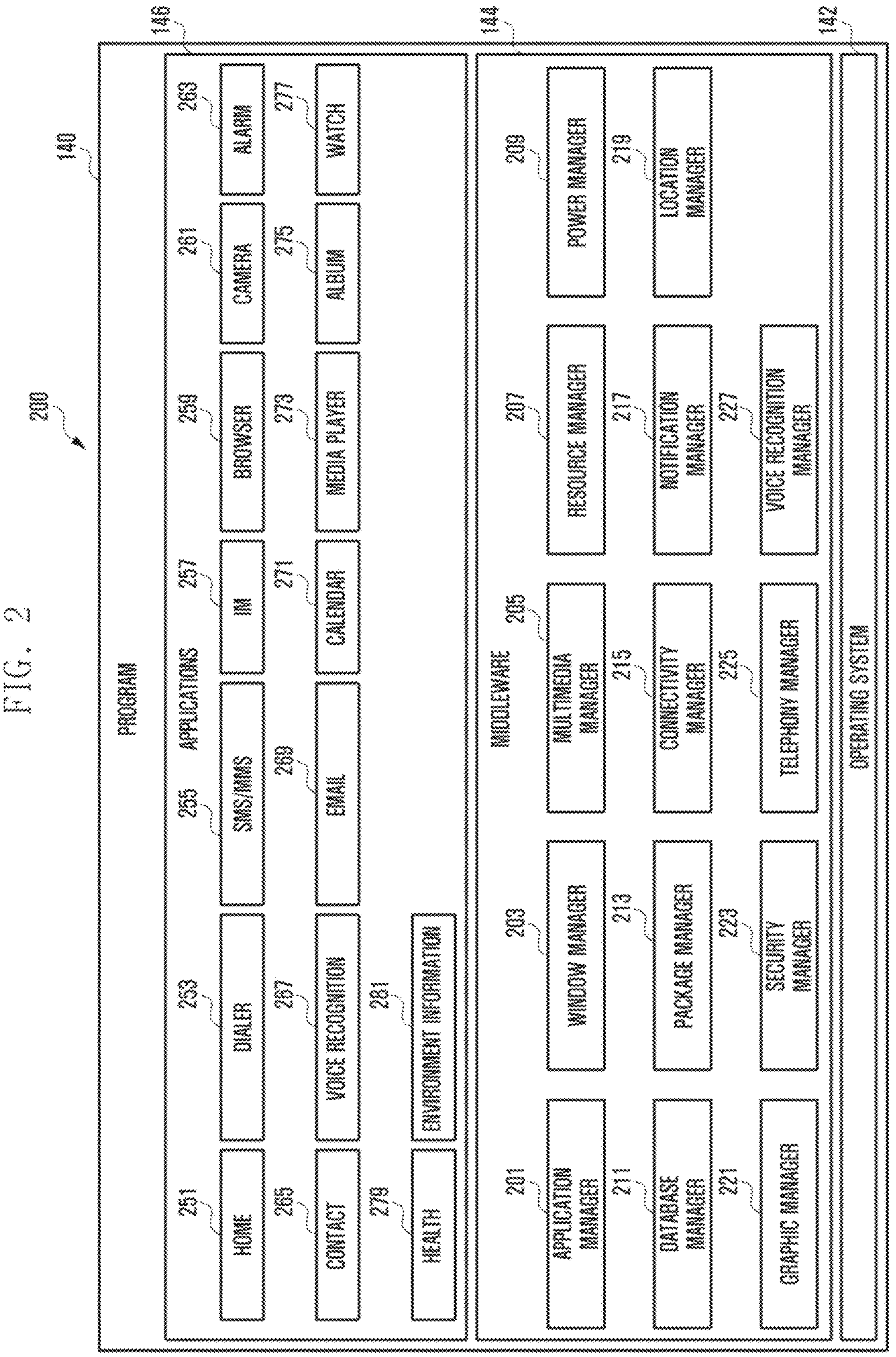
FIG. 2 is a block diagram of a program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
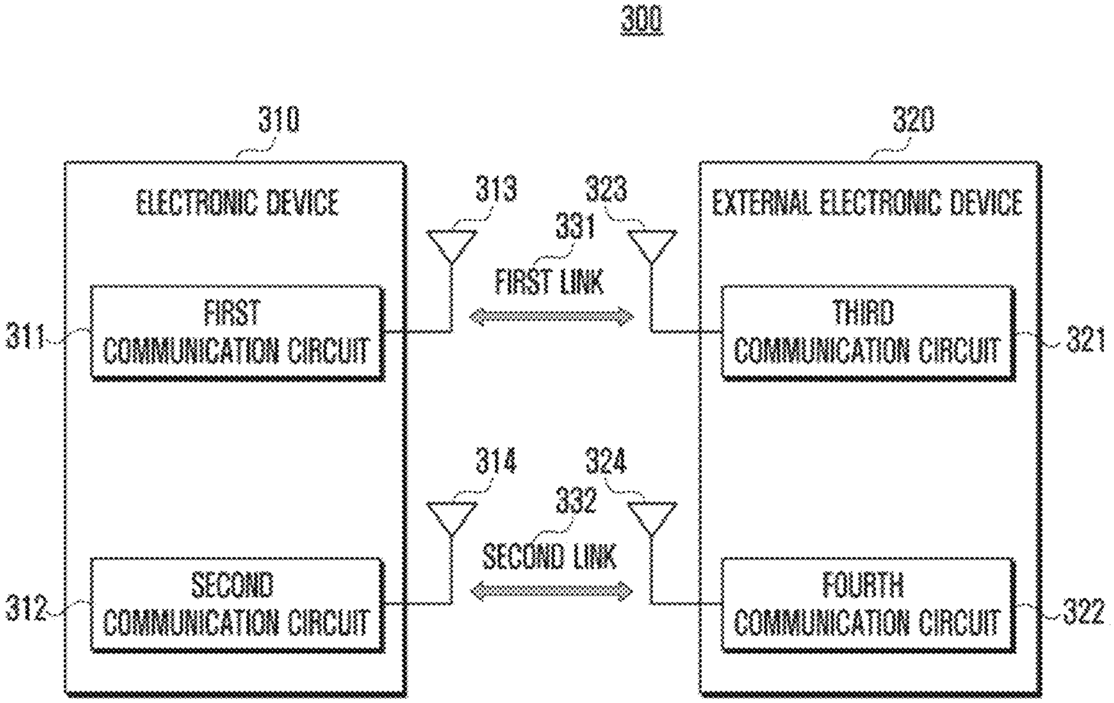
FIG. 3 illustrates an embodiment in which an electronic device and an access point (AP) operate through a multi-link operation (MLO) according to various embodiments of the disclosure.

FIG. 3 illustrates an embodiment in which an electronic device and an access point (AP) operate through a multi-link operation (MLO) according to various embodiments of the disclosure.

Referring to FIG. 3, a WLAN system 300 may include an electronic device 310 and/or an external electronic device 320. According to an embodiment, the electronic device 310 may perform wireless communication with the external electronic device 320 through short-range wireless communication. Wireless communication may be various communication schemes that may be supported by both the electronic device 310 and/or the external electronic device 320. For example, the wireless communication may be Wi-Fi. The external electronic device 320 is at least one electronic device 310 located within a communication radius of the WLAN system 300 and may serve as a base station which provides wireless communication. For example, the external electronic device 320 may include an access point (AP) of IEEE 802.11. The electronic device 310 may include a station (STA) of IEEE 802.11.

According to various embodiments of the disclosure, the electronic device 310 and/or the external electronic device 320 may support the multi-link operation (MLO). The multi-link operation may be an operation mode in which data is transmitted or received through a plurality of links (for example, a first link 331 and a second link 332). The multi-link operation is an operation mode scheduled to be introduced to IEEE 802.11be and may be an operation mode in which data is transmitted or received through a plurality of links based on a plurality of bands or channels.

According to various embodiments of the disclosure, the electronic device 310 may include a plurality of communication circuits (for example, a first communication circuit 311 and/or a second communication circuit 312) in order to support the multi-link operation. The first communication circuit 311 may transmit data to the external electronic device 320 through the first link 331 or receive data transmitted by the external electronic device 320 through the first link 331. The first communication circuit 311 may output or receive signals in a frequency band corresponding to the first link 331 through a first antenna 313. The second communication circuit 312 may transmit data to the external electronic device 320 through the second link 332 or receive data transmitted by the external electronic device 320 through the second link 332. The second communication circuit 312 may output or receive signals in a frequency band corresponding to the second link 332 through a second antenna 314.

According to various embodiments of the disclosure, the external electronic device 320 may include a plurality of communication circuits (for example, a third communication circuit 321 and/or a fourth communication circuit 322) in order to support the multi-link operation. The third communication circuit 321 may transmit data to the electronic device 310 through the first link 331 or receive data transmitted by the electronic device 310 through the first link 331. The third communication circuit 321 may output or receive signals in a frequency band corresponding to the first link 331 through a third antenna 323. The fourth communication circuit 322 may transmit data to the electronic device 310 through the second link 332 or receive data transmitted by the electronic device 310 through the second link 332. The fourth communication circuit 322 may output or receive signals in a frequency band corresponding to the second link 332 through a fourth antenna 324.

According to various embodiments of the disclosure, the frequency band of the first link 331 and the frequency band of the second link 333 may be different from each other. For example, the frequency band of the first link 331 may be 2.5 GHZ, and the frequency band of the second link 332 may be 5 GHz or 6 GHz.

According to various embodiments of the disclosure, the first link 331 and the second link 332 may use different electronic devices as well as the electronic device 310. In order to prevent data transmission or reception between the electronic device 310 and other electronic devices through the same link, the electronic device 310 may support a carrier sense multiple access with collision avoidance (CSMA/CA) scheme. The CSMS/CA scheme may be a scheme of transmitting data when a specific link (for example, the first link 331 and/or the second link 332) is in an idle state. The electronic device 310 supporting CSMA/CA may identify whether another electronic device transmits data through the specific link and, when detecting data transmission, may wait without transmitting data through the specific link. The electronic device 310 supporting the CSMA/CA may transmit data through the specific link according to a predetermined scheme (for example, activate a timer and transmit data when the timer expires) in response to identification that the other electronic device does not transmit data through the specific link. Through the above scheme, the electronic device 310 may transmit and/or receive data through the specific link without collision with another electronic device.

According to various embodiments of the disclosure, the first link 331 and/or the second link 332 supported by the multi-link operation may independently support the CSMA/CA.

The electronic device 310 supporting the CSMA/CA scheme may identify whether the specific link is in the idle state before transmitting data. The electronic device 310 may transmit data through the specific link in the idle state.

The electronic device 310 may identify whether the first link 331 is in the idle state, based on information related to the idle state of the first link 331 included in data transmitted by the external electronic device 320. The information related to the idle state of the first link 331 may include a clear channel assessment state (CCA) field and/or network allocation vector (NAV) configuration field. The information related to the idle state of the first link 331 may be included in a ready to send (RTS) message that requires data transmission through the first link 331 or a clear to send (CTS) message indicating that data transmission through the first link 331 is possible. The electronic device 310 may identify whether the specific link is in the idle state with reference to the clear channel assessment (CCA) state field and/or the network allocation vector (NAV) configuration field. The electronic device 310 may determine whether the first link 331 is physically in the idle state with reference to the CCA state field and determine whether the first link 331 is logically in the idle state with reference to the NAV configuration field. The electronic device 310 may activate a timer in response to identification that the first link 331 is in the idle state, and transmit data to the external electronic device 320 through the first link 331 in response to expiration of the timer after a predetermined time.

The electronic device 310 may identify whether the second link 332 is in the idle state, based on information related to the idle state of the second link 332 included in data transmitted by the external electronic device 320. The information related to the idle state of the second link 332 may include a clear channel assessment state (CCA) field and/or network allocation vector (NAV) configuration field. The information related to the idle state of the second link 332 may be included in a ready to send (RTS) message that requires data transmission through the second link 332 or a clear to send (CTS) message indicating that data transmission through the second link 332 is possible. The electronic device 310 may identify whether the specific link is in the idle state with reference to the clear channel assessment (CCA) state field and/or the network allocation vector (NAV) configuration field. The electronic device 310 may determine whether the second link 332 is physically in the idle state with reference to the CCA state field and determine whether the second link 331 is logically in the idle state with reference to the NAV configuration field. The electronic device 310 may activate a timer in response to identification that the specific link is in the idle state, and transmit data to the external electronic device 320 through the second link 332 in response to expiration of the timer after a predetermined time.

Figure 4A:
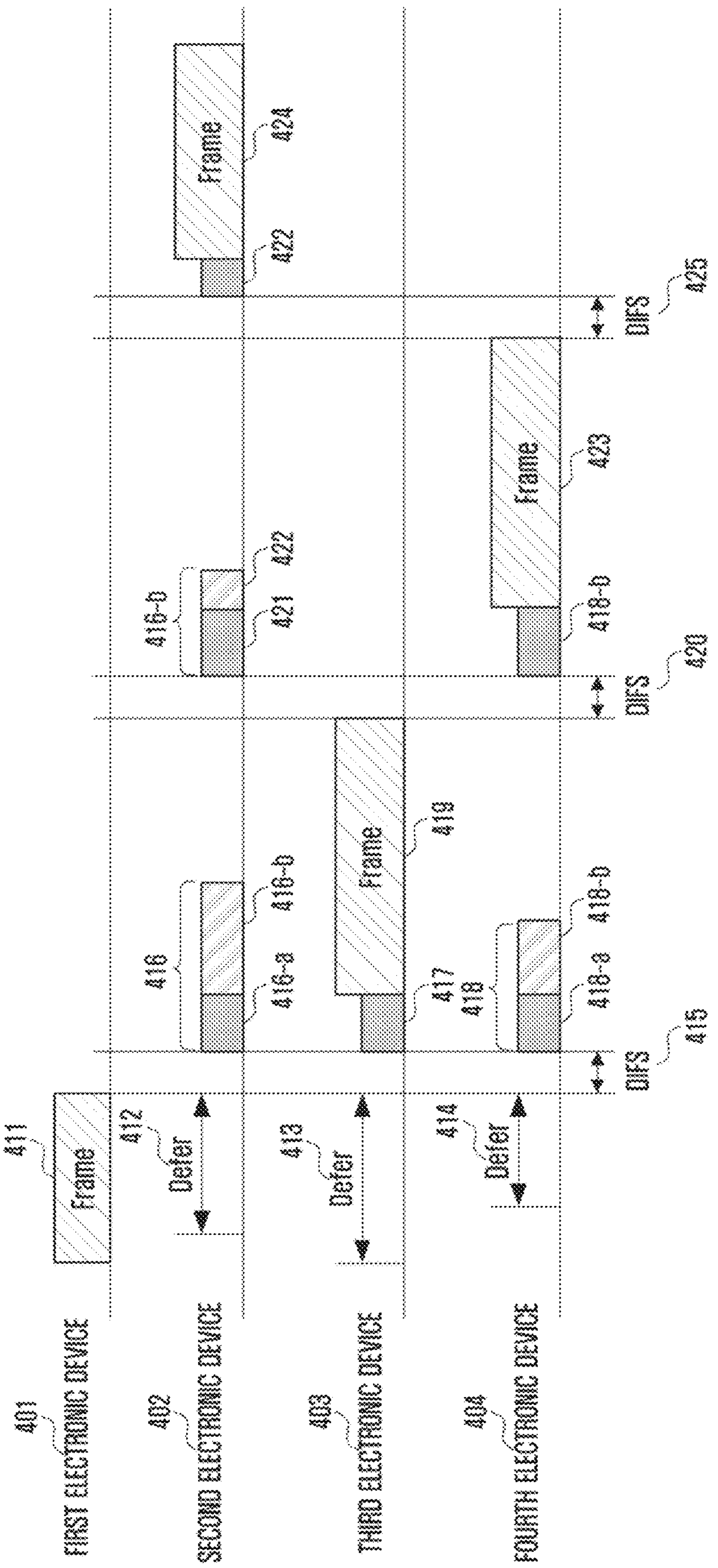
FIG. 4A illustrates an embodiment in which the electronic device performs medium synchronization of a link according to various embodiments of the disclosure.

FIG. 4A illustrates an embodiment in which the electronic device performs medium synchronization of a link according to various embodiments of the disclosure.

FIG. 4A illustrates an embodiment in which a first electronic device 401 (for example, the electronic device 310 of FIG. 3), a second electronic device 402 (for example, the electronic device 310 of FIG. 3), a third electronic device 403 (for example, the electronic device 310 of FIG. 3), and/or a fourth electronic device 404 (for example, the electronic device 310 of FIG. 3) transmit data to the external electronic device 320 through the same link (for example, the second link 332 of FIG. 3).

According to various embodiments of the disclosure, the first electronic device 401, the second electronic device 402, the third electronic device 403, and/or the fourth electronic device 404 may transmit data through the CSMA/CA scheme. The first electronic device 401, the second electronic device 402, the third electronic device 403, and/or the fourth electronic device 404 may perform medium synchronization of the second link 332 before transmitting data. The medium synchronization of the second link 332 may mean the state in which the state of the second link 332 can be updated in real time. The medium synchronization of the second link 332 may be performed using a part of data (header of data) transmitted through the second link 332.

The first electronic device 401 supporting the CSMA/CA scheme may identify whether a specific link (for example, the first link 331 and/or the second link 332) is in the idle state before transmitting data 411. The first electronic device 401 may identify whether the second link 332 is in the idle state, based on information related to the idle state of the second link 332 included in data transmitted by the external electronic device 320. The information related to the idle state of the second link 332 may include a clear channel assessment state (CCA) field and/or network allocation vector (NAV) configuration field. The information related to the idle state of the second link 332 may be included in a ready to send (RTS) message that requires data transmission through the second link 332 or a clear to send (CTS) message indicating that data transmission through the second link 332 is possible. The first electronic device 401 may identify whether the specific link is in the idle state with reference to the clear channel assessment (CCA) state field and/or the network allocation vector (NAV) configuration field. The first electronic device 401 may determine whether the second link 332 is physically in the idle state with reference to the CCA state field and determine whether the second link 332 is logically in the idle state with reference to the NAV configuration field. The first electronic device 401 may activate a timer in response to identification that the specific link is in the idle state, and transmit the data 411 to the external electronic device 320 through the second link 332 in response to expiration of the timer after a predetermined time.

The second electronic device 402, the third electronic device 403, and/or the fourth electronic device 404 supporting the CSMA/CA may wait without transmitting other data while the first electronic device 401 transmits the data 411 in operations 412, 413, and 414. The second electronic device 402, the third electronic device 403, and/or the fourth electronic device 404 may determine an end time of transmission of the data 411, based on a part of the data 411 (for example, a rate field of data and/or a length field of the data included in a PHY header, or a duration field of data included in a MAC header) transmitted through the second link 332, and wait for a predetermined time 415, based on the end of the transmission of the data 411.

The second electronic device 402, the third electronic device 403, and/or the fourth electronic device 404 may activate the timer after the predetermined time 415 and transmit data to the external electronic device 320 through the second link 332 in response to expiration of the timer. The length of timers configured in the second electronic device 402, the third electronic device 403, and/or the fourth electronic device 404 may be different. According to an embodiment, the second electronic device 402, the third electronic device 403, and/or the fourth electronic device 404 may identify whether randomly configured timer has expired and may transmit data according to expiration of the timer.

Referring to FIG. 4A, the second electronic device 402 may activate a timer in which a first period 416 is configured, and third electronic device 403 may activate a timer in which a second period 417 is configured, and the fourth electronic device 404 may activate a timer in which a third period 418 is configured. The first period 416, the second period 417, and/or the third period 418 may be different from each other. Referring to FIG. 4, the first period 416 may be longer than the third period 418, and the third period 418 may be longer than the second period 417.

According to various embodiments of the disclosure, the third electronic device 403 may transmit data 419 to the external electronic device 320 through the second link 332 in response to identification of expiration of the third period 417. The second electronic device 402 and/or the fourth electronic device 404 may wait without transmitting other data while the third electronic device 403 transmits the data 419. The second electronic device 402 may store the remaining period 416-*b* obtained by subtracting an elapsed period 416-*a* from the first period 416, and the fourth electronic device 404 may store the remaining period 418-*b* obtained by subtracting an elapsed period 418-*a* from the third period 418. The second electronic device 402*b* and/or the fourth electronic device 404 may determine an end time of transmission of the data 419, based on a part of the data 419 (for example, a rate field of data and/or a length field of the data included in a PHY header, or a duration field of data included in a MAC header) transmitted through the second link 332, and wait for a predetermined time 420, based on the end of the transmission of the data 419.

The second electronic device 402 and/or the fourth electronic device 404 may activate the timer again after the predetermined time 420 passes. The fourth electronic device 404 may transmit data 423 to the external electronic device 320 through the second link 332 in response to identification of expiration of the remaining period 418-*b*. The second electronic device 402 may detect transmission of the data 423 from the fourth electronic device 404 before the remaining period 416-*b* expires, and may activate the operation of the timer again. The second electronic device 402 may store the remaining period 422 obtained by subtracting an elapsed time 421 from the remaining period 416-*b*. The second electronic device 402 may determine an end time of transmission of the data 423, based on a part of the data 423 (for example, a rate field of data and/or a length field of the data included in a PHY header, or a duration field of data included in a MAC header) transmitted through the second link 332, and wait for a predetermined time 425, based on the end of the transmission of the data 423.

The second electronic device 402 may activate the timer again after the predetermined time 425 passes. The fourth electronic device 404 may transmit data 424 to the external electronic device 320 through the second link 332 in response to identification that the remaining period 422 expires.

As described above, the first electronic device 401, the second electronic device 402, the third electronic device 403, and/or the fourth electronic device 404 may perform medium synchronization of the second link 332.

Through the scheme illustrated in FIG. 4A, the first electronic device 401, the second electronic device 402, the third electronic device 403, and/or the fourth electronic device 404 supporting the CSMA/CA may transmit data to the external electronic device 320 through the second link 332 without any collision.

Figure 4B:
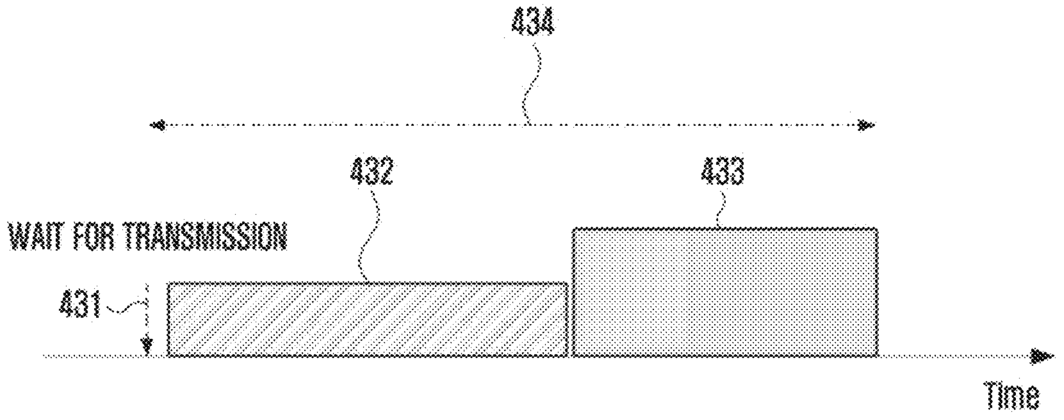
FIG. 4B illustrates latency of a link according to various embodiments of the disclosure.

FIG. 4B illustrates latency of a link according to various embodiments of the disclosure.

Referring to FIG. 4B, an electronic device (for example, the first electronic device 401, the second electronic device 402, the third electronic device 403, and/or the fourth electronic device 404 of FIG. 4A) may transmit data through a link (for example, the first link 331 of FIG. 3 or the second link 332 of FIG. 3) provided by an AP (for example, the external electronic device 302 of FIG. 3). Although FIG. 4B illustrates the second electronic device 402 as the electronic device 402 for convenience of description, the description of FIG. 4B may be applied to other electronic devices (for example, the first electronic device 401, the third electronic device 403, and/or the fourth electronic device 404 of FIG. 4A). According to an embodiment, the electronic device 402 may transmit data related to a service through a link 331 or 332 generated between the electronic device 402 and the AP 302 in order to perform various services (for example, streaming services, voice calls, or video calls) in the electronic device 402.

The electronic device 402 may detect a need of data transmission and wait for data transmission in operation 431. The electronic device 402 may transmit data through the links 331 and 332 by using the CSMA/CA scheme as illustrated in FIG. 4A.

The electronic device 402 may identify that the links 331 and 332 are in the idle state for data transmission and activate the timer. The electronic device 402 may identify that the link 331 or 332 is occupied by another electronic device (for example, the first electronic device 401, the third electronic device 403 or the fourth electronic device 404 of FIG. 4A) before the activated timer expires and switch the timer to an inactive state. The electronic device 402 may wait without transmitting data through the link 331 or 332.

The electronic device 402 may wait for data transmission until the links 331 and 332 are in the idle state and the timer expires. A time for which data transmission is waited for may be defined as a contention time 432.

The electronic device 402 may identify that the links 331 and 332 are in the idle state again, activate the deactivated timer again, and transmit data through the links 331 and 332 after the remaining time of the timer expires. A period between a time point at which data transmission starts and a time point at which data transmission is completed may be defined as a transmission time 433.

Referring to FIG. 4B, a period between a time point 431 at which the electronic device 402 waits for data transmission and the time point at which data transmission is completed may be defined as latency 434.

The latency 434 may be configured as a value that represents a link state. According to an embodiment, the contention time 432 included in the latency 434 may change according to the link state. For example, the contention time 432 may become longer as a channel utilization of the link is higher, and a link state having the long contention time 432 may be not good. In another example, the contention time 432 may become shorter as the channel utilization of the link is lower, and a link state having the short contention time 432 may be relatively good. Accordingly, the link state may not be relatively good when the latency 434 is relatively long, and the link state may be relatively good when the latency 434 is relatively short.

The electronic device 402 may control a plurality of links (for example, the first link 331 and/or the second link 332 of FIG. 3), based on the link state.

For example, in order to reduce power (or current) consumption of the electronic device 402, the electronic device 402 may deactivate at least some links among the plurality of links (for example, the first link 331 and/or the second link 332 of FIG. 3). Alternatively, in order to improve the quality of service performed by the electronic device 402, the electronic device 402 may activate at least some links among the plurality of links 331 and 332.

The electronic device 402 may identify the contention time to control the links 331 and 332.

However, the contention time may vary depending on the use of other electronic devices (for example, the first electronic device 401, the third electronic device 403, and the fourth electronic device 404 of FIG. 4A) that are occupying or may occupy the links 331 and 332, and accurate prediction may be difficult. For example, when the size of data transmitted by other electronic devices 401, 403, and 404 through the links 331 and 332 frequently changes, it may be difficult to predict the contention time.

Figure 4C:
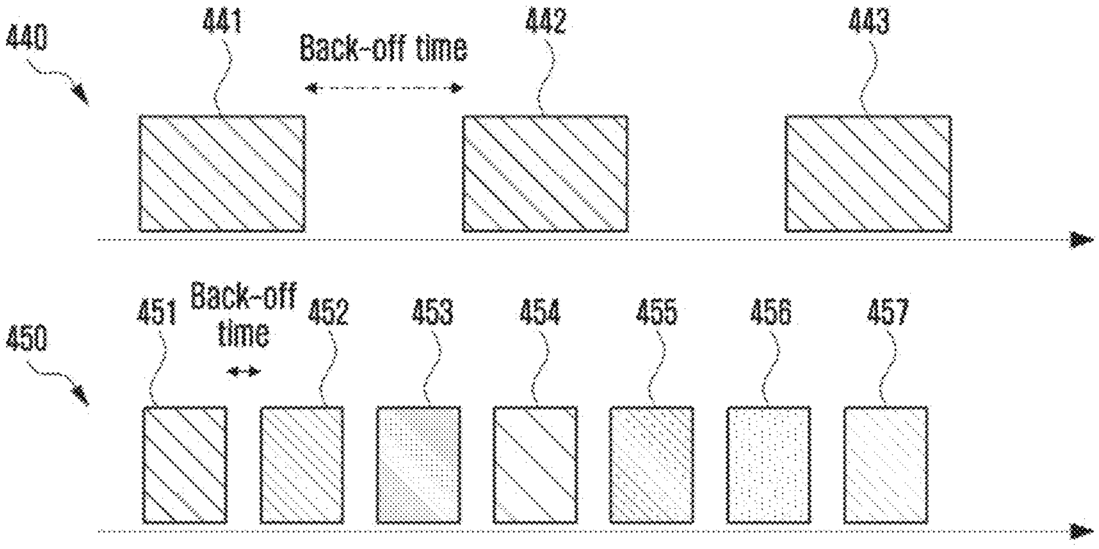
FIG. 4C illustrates an embodiment of determining latency of the link by using channel utilization according to various embodiments of the disclosure.

FIG. 4C illustrates an embodiment of determining latency of the link by using channel utilization according to various embodiments of the disclosure.

The channel utilization may be a ratio of the time during which the links are occupied by the electronic devices (for example, the first electronic device 401, the third electronic device 403, and the fourth electronic device 404 of FIG. 4A) to the time during which the links (for example, the first link 331 and the second link 332 of FIG. 3) are activated. The larger channel utilization may mean that a degree of utilization of the links 331 and 332 by the electronic devices 401, 402, 403, and 404 is larger and also mean that a relatively long contention time is to transmit data through the links 331 and 332. The lower channel utilization may mean that a degree of utilization of the links 331 and 332 by the electronic devices 401, 402, 403, and 404 is lower and also mean that a relatively short contention time is to transmit data through the links 331 and 332.

The electronic devices 401, 402, 403, and 404 may determine the contention time, based on the channel utilization. However, when the contention time is determined (or predicted) in consideration of the channel utilization, difference between the determined (or predicted) contention time and the actual contention time may increase.

For example, the channel utilization in the situation where one electronic device 401 transmits data having the large size through the links 331 and 332 may be the same as the channel utilization in the situation where many electronic devices 401, 402, 403, and 404 transmit data through the links 331 and 332.

Considering the situation 440 where the first electronic device 401 transmits data having the large size through the links 331 and 332, the first electronic device 401 may transmit data in every predetermined time 441, 442, and 443 (predetermined periods). The electronic device (for example, the second electronic device 402 of FIG. 4A) to transmit data through the links 331 and 332 may secure data transmission opportunities by performing contention for data transmission through the CSMA/CA scheme with the first electronic device 401 transmitting data after the first electronic device 401 which is transmitting data completes some of the data transmission. The second electronic device 402 may secure appropriate transmission opportunities through contention with the first electronic device 401 transmitting data.

However, considering the situation 450 where various electronic devices 401, 403, and 404 transmit data through the links 331 and 332, the first electronic device 401 may transmit data for a predetermined time 451. After the predetermined time 451 expires, other electronic devices 402, 403, and 404 may perform contention for data transmission through the CSMA/CA scheme. When the timer of the second electronic device 402 expires earlier than timers of the other electronic devices 401, 403, and 404, the second electronic device 402 may transmit data for a predetermined time 452. After data transmission of the second electronic device 402 is completed, the other electronic devices 401, 403, and 404 may perform contention for data transmission through the CSMA/CA scheme. When the timer of the third electronic device 403 expires earlier than timers of the other electronic devices 401, 402, and 404, the third electronic device 403 may transmit data for a predetermined time 453. After data transmission of the third electronic device 403 is completed, the other electronic devices 401, 402, and 404 may perform contention for data transmission through the CSMA/CA scheme. When the timer of the fourth electronic device 404 expires earlier than timers of the other electronic devices 401, 402, and 403, the fourth electronic device 404 may transmit data for a predetermined time 454. After data transmission of the fourth electronic device 404 is completed, the other electronic devices 401, 402, and 403 may perform contention for data transmission through the CSMA/CA scheme. When the timer of the first electronic device 401 expires earlier than timers of the other electronic devices 402, 403, and 404, the first electronic device 401 may transmit data for a predetermined time 455. After data transmission of the first electronic device 401 is completed, the other electronic devices 402, 403, and 404 may perform contention for data transmission through the CSMA/CA scheme. When the timer of the second electronic device 402 expires earlier than timers of the other electronic devices 401, 403, and 404, the second electronic device 402 may transmit data for a predetermined time 456. After data transmission of the second electronic device 402 is completed, the other electronic devices 401, 403, and 404 may perform contention for data transmission through the CSMA/CA scheme. When the timer of the third electronic device 403 expires earlier than timers of the other electronic devices 401, 402, and 404, the third electronic device 403 may transmit data for a predetermined time 457.

The situation 450 where various electronic devices 401, 403, and 404 transmit data through the links 331 and 332 may have the same channel utilization as the situation 440 where one electronic device 401 transmits data having the large size through the links 331 and 332. However, the contention time in the situation 450 where various electronic devices 401, 403, and 404 transmit data through the links 331 and 332 may be different from the contention time in the situation 440 wherein one electronic device 401 transmits data having the large size through the links 331 and 332.

It may be to determine (or predict) the accurate contention time for not only the link control but also various controls (for example, AP roaming and D2D communication connection) and, hereinafter, various operations based on determination of the accurate contention time and latency will be described.

Figure 5:
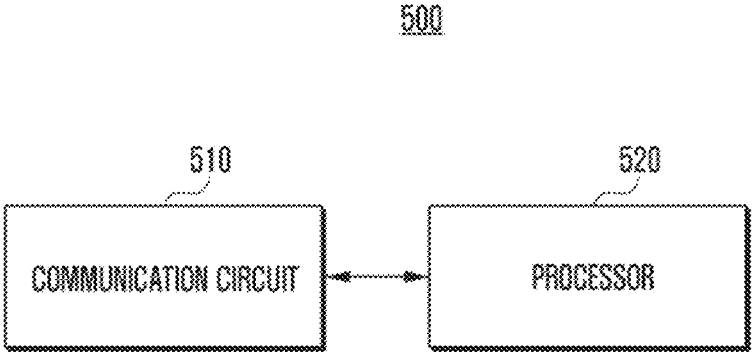
FIG. 5 is a block diagram of the electronic device according to various embodiments of the disclosure.

FIG. 5 is a block diagram of an electronic device according to various embodiments of the disclosure.

According to various embodiments of the disclosure, an electronic device 500 (for example, the electronic device 310 of FIG. 3) may include a communication circuit 510 (for example, the first communication circuit 311 or the second communication circuit 312 of FIG. 4B) and/or a processor 520 (for example, the processor 120 of FIG. 1). In another exemplary embodiment, the processor is at least one processor.

In FIG. 5, the first electronic device 401 is described as an external electronic device 401 for convenience of description, but the description of FIG. 5 may be applied to other electronic devices (for example, the second electronic device 402, the third electronic device 403, and/or the fourth electronic device 404 of FIG. 4A).

The communication circuit 510 may include various circuit structures used for modulating and/or demodulating a signal within the electronic device 310. For example, the communication circuit 510 may modulate a signal in a baseband into a signal in a radio frequency (RF) band to output the signal through an antenna or demodulate the signal in the RF band received through the antenna into the signal in the baseband, and transmit the signal to the processor 520.

The communication circuit 510 may transmit a plurality of packets to an AP (for example, the external electronic device 320 of FIG. 3) through a first link (for example, the first link 331 of FIG. 3) or receive data transmitted by the AP 320 through the first link 331. The communication circuit 510 may transmit packets to the AP 320 through a second link (for example, the second link 332 of FIG. 3) or receive packets transmitted by the AP 320 through the second link 332. The communication circuit 510 may output or receive a signal in a frequency band corresponding to the first link 331 through an antenna (for example, the first antenna 313 of FIG. 3) and output or receive a signal in a frequency band corresponding to the second link 332 through an antenna (for example, the second antenna 314 of FIG. 3).

The processor 520 may perform operations of receiving data transmitted by an application processor (for example, the processor 120 of FIG. 1) and generating packets for transmitting the received data to the AP 320. The processor 520 may be defined as a communication processor (or a communication processor) included in a communication module (for example, the communication module 192 of FIG. 1). According to an embodiment, the processor 520 may generate packets by performing channel coding based on data transmitted by the application processor (for example, the application processor 120 of FIG. 1), identify whether there is an error in at least some of the data transmitted by the external electronic device 320, or when the error occurs, perform an operation of recovering the error (for example, hybrid auto repeat request (HARQ)).

The processor 520 may be operatively connected to the communication circuit 510 and may control the operation of the communication circuit 510. The processor 520 may receive data transmitted by the application processor 120 and transmit packets corresponding to data, based on characteristics of service included in the data or select a channel to be used for reception.

The processor 520 may determine latency of the first link 331 before transmitting data through the first link 331.

The latency may be determined based on the contention time between a time point at which waiting for data transmission starts and a time point at which data transmission starts and a transmission time between the time point at which data transmission starts and a time point at which data transmission is completed.

According to an embodiment, the processor 520 may determine a value obtained by adding the contend time and the transmission time as the latency. According to an embodiment, the processor 520 may determine a value obtained by adding the contention time, the transmission time, and another time (for example, a distributed inter frame space (DIFS) as the latency.

When determining (or predicting) the contend time, the processor 520 may determine a time until counters allocated to the electronic device 500 are all subtracted. When the counters are all subtracted, the electronic device 500 can transmit data, and the time until the counters are all subtracted (for example, including a time during which another electronic device transmits data and a time to subtract the counters when the first link 331 is in the idle state) may be the same as or similar to the contention time. Accordingly, the processor 520 may determine the time until the counters allocated to the electronic device 500 are all subtracted and configure the determined time as the contention time, so as to predict (or determine) the accurate contention time.

When determining the time until the counters allocated to the electronic device 500 are all subtracted, the processor 520 may identify the time until the counters are subtracted in predetermined units (for example, 1 slot) and configure a value obtained by multiplying the predetermined number of times and the time until the counters are subtracted in predetermined units (for example, 1 slot) as the time until the counters allocated to the electronic device 500 are all subtracted.

The processor 520 may identify a ratio between the time for subtracting the counters which can be used by the electronic device 500 to perform contention of the CSMA/CA scheme in every predetermined unit (for example, 1 slot, period to transmit/receive data, or communication period) and the time during which the first link 331 exists in the idle state. The ratio between the time for subtracting the counters in every predetermined unit (for example, 1 slot) and the time during which the first link 331 exists in the idle state may be the number of times the subtraction is possible when the first electronic device 331 exists in the idle state and the electronic device 500 participates in the contention.

For example, the processor 520 may identify a ratio between the time for subtracting the counters in every predetermined unit (for example, 1 slot) and the time during which the first link 331 exists in the idle state, based on [Equation 1] below.

$$\frac{Ton - Tcca}{Tslot} \qquad \text{[Equation 1]}$$

($T_{on}$: time during which first link 331 is monitored, $T_{eca}$: time during which first link 331 is occupied by external electronic device 401, $T_{slot}$: time for subtracting one unit of counters)

As shown in Equation 1, the processor 520 may determine an idle time of the first link by subtracting the second time from the first time and determine a contention time corresponding to a waiting time for data transmission, based on a ratio between the idle time and a time for subtracting counters allocated to the electronic device during one slot.

Referring to FIG. 1, difference between a first time corresponding to a time during which the first link 331 is monitored and a second time corresponding to a time during which the first link 331 is occupied by the external electronic device 401 may be a time during which the first link 331 exists in the idle state (or a time during which the electronic device 500 can subtract the counters), and a time obtained by dividing the time during which the first link 331 exists in the idle state by a time for the counters to subtract one unit may be the number of counters which the electronic device 500 can subtract in an idle time.

Alternatively, the processor 520 may identify a ratio between the time to subtract the counters in every predetermined unit (for example, 1 slot) and the time during which the first link 331 exists in the idle state, based on the first time corresponding to the time during which the first link 331 is monitored and a third time corresponding to the time during which the first link 331 exists in the idle state.

The processor 520 may identify the contention time of the electronic device 400 when one counter is subtracted. When the one counter is subtracted by dividing the second time corresponding to the time during which the first link 331 is occupied by the external electronic device 401 by the number of counters which the electronic device 500 can subtract from the idle time acquired in [Equation 1], the processor 520 may identify the contention time per unit that means the contention time of the electronic device 400. For example, the processor 520 may identify the contention time per counter unit, based on [Equation 2] below.

$$\frac{Tcca * Tslot}{Ton - Tcca} \qquad \text{[Equation 2]}$$

($T_{on}$: first time during which first link 331 is monitored, $T_{eca}$: second time during which first link 331 is occupied by external electronic device 401, $T_{slot}$: time for subtracting one unit by counters)

Referring to FIG. 2, a value obtained by dividing the second time occupied by the external electronic device 401 by the number of counters which the electronic device 500 can subtract may be the contention time per counter unit.

The processor 520 may determine the contention time by multiplying the contention time per counter unit time and a predetermined number of counters. The predetermined number of counters may be the number of allocated counters when the electronic device 500 participates in the contention. The predetermined number of counters may be determined when the electronic device 500 participates in the contention. Accordingly, the processor 520 may configure an average value of counters to be allocated when the electronic device 500 participates in the contention, and determine the contention time. The average value of the counters to be allocated may be an average of values of counters which can be allocated to the electronic device 500. Alternatively, the average value of the counters to be allocated may be an average of values of counters previously allocated to the electronic device 500. Alternatively, the average value of the counters to be allocated may be an average value of values of counters (for example, values of counters allocated to the electronic device 500 or the external electronic device 401) acquired through monitoring of the first link 331 by the electronic device 500. According to an embodiment, the processor 520 may determine the contention time, based on [Equation 3] below.

$$\frac{Tcca * Tslot * Nslot}{Ton - Tcca} \quad \text{[Equation 3]}$$

($T_{on}$: first time during which first link 331 is monitored, $T_{eca}$: second time during which first link 331 is occupied by external electronic device 401, $T_{slot}$: time for subtracting one unit by counters, $N_{slot}$: number of counters which can be allocated when electronic device 500 participates in contention)

When determining the contention time, the processor 520 may monitor the first link 331. The processor 520 may determine (or predict) the contention time, based on information on the first link 331 acquired through monitoring of the first link 331. The information on the first link 331 may include first time information indicating the time during which the first link 331 is monitored and second time information indicating the time during which the first link 331 is occupied by the external electronic device 401. Monitoring of the first link 331 may be performed by the electronic device 500, but may be performed by the AP 320 to reduce power consumption of the electronic device 500. When the monitoring of the first link 331 is performed by the AP 320, the processor 520 may transmit a signal making a request for the first time information and the second time information to the AP 320, and the AP 320 may transmit a response message including the first time information and the second time information to the electronic device 500.

As a part of the operation for determining latency, the processor 520 may determine a transmission time between a time point at which data transmission starts and a time point at which data transmission is completed.

When determining the transmission time, the processor 520 may determine the transmission time, based on the size of data to be transmitted and an uplink reference data rate of the first link 331. The processor 520 may determine the transmission time by dividing the size of the data to be transmitted by the data rate. The processor 520 may determine the transmission time, based on [Equation 4] below.

$$\frac{\text{payload}}{Rul} \quad \text{[Equation 4]}$$

(payload: data size, $R_{ul}$: uplink reference data rate of first link 331)

When determining the transmission time, the processor 520 may determine the transmission time, based on the type of service being performed by the electronic device 500 or the type of data. For example, when the service being performed by the electronic device 500 is service for transmitting relatively large volume of data, the processor 520 may determine the transmission time by configuring the data size to be large. When the type of data to be transmitted by the electronic device 500 is relatively large in capacity, the processor 520 may determine the transmission time by configuring the data size to be large.

The processor 520 may determine the latency, based on the contention time and the transmission time. The processor 520 may determine the latency by adding the contention time and the transmission time.

When determining the latency, the processor 520 may determine the latency, based on a success rate of data transmission. Even though data is transmitted for a time obtained by adding the contention time and the transmission time, the AP 320 may fail in receiving the data for various reasons, and when the AP 320 fails in receiving the data, the electronic device 500 should perform contention with the external electronic device 401 to transmit the data again and transmit the data after a timer expires. Accordingly, the processor 520 may determine the latency by dividing the value obtained by adding the contention time and the transmission time by the success rate of the data transmission. According to an embodiment, the processor 520 may determine the latency by using [Equation 5] below.

$$\frac{\left(Tx\ \text{time} + \frac{Tcca * Tslot * Nslot}{Ton - Tcca}\right)}{\text{success rate}} \quad \text{[Equation 5]}$$

($T_{on}$: first time during which first link 331 is monitored, $T_{eca}$: second time during which first link 331 is occupied by external electronic device 401, $T_{slot}$: time for subtracting one unit by counters, $N_{slot}$: number of counters which can be allocated when electronic device 500 participates in contention, Tx time: transmission time between time point at which electronic device 500 starts data transmission and time point at which transmission is completed, success rate: data transmission success rate)

The processor 520 may determine (or predict) the accurate latency through the above-described method. When the contention time is determined (or predicted) using the above-described method, the contention time can be predicted in consideration of the time during which the external electronic device 401 occupies the channel rather than the simple channel utilization while the counters are subtracted, and thus the accurate contention time can be predicted.

The processor 520 may perform at least one operation, based on the determined latency.

The processor 520 may control a plurality of links including the first link 331, based on the determined latency.

The processor 520 may determine (or predict) the latency of not only the first link 331 but also each of the plurality of links between the AP 320 and the electronic device 500. The processor 520 may determine the latency of each of the plurality of links (link latency) and determine the latency of at least one link and a combination of two or more links among the plurality of links.

When determining the latency of the combination of two or more links, the processor 520 may determine a harmonic mean of the latency of links included in the combination of the links as the latency of the combination. The harmonic mean of the latency of the links may mean a reciprocal number of the sum of reciprocal numbers of the latency of the links.

For example, the processor 520 may determine the latency of the combination of links by using [Equation 6] below.

$$T = \frac{1}{\sum\left(\frac{1}{Ti}\right)} \qquad \text{[Equation 6]}$$

(T: latency of combination of links, Ti: latency of $i^{th}$ link)

When the electronic device 500 can be connected to the AP 320 through the first link 331, the second link 332, and/or the third link, the processor 520 may determine latency of combinations of links as shown in [Table 1] below.

TABLE 1

| Links or combination of links | Latency |
|---|---|
| First link | T1 |
| Second link | T2 |
| Third link | T3 |
| First link and second link | $\frac{1}{\frac{1}{T1}+\frac{1}{T2}}$ |
| First link and third link | $\frac{1}{\frac{1}{T1}+\frac{1}{T3}}$ |
| Second link and third link | $\frac{1}{\frac{1}{T2}+\frac{1}{T3}}$ |
| First link, second link, and third link | $\frac{1}{\frac{1}{T1}+\frac{1}{T2}+\frac{1}{T3}}$ |

For convenience of description, it is assumed that latency of the second link is shorter than latency of the first link, and latency of the third link is shorter than latency of the second link. Referring to [Table 1], latency of a combination of the first link, the second link, and the third link may be shorter than latency of the second link and the third link. The latency of the second link and the third link may be shorter than latency of the first link and the third link. The latency of the first link and the third link may be shorter than latency of the first link and the second link. The latency of the first link and the second link may be shorter than latency of the third link.

When a predetermined period or a predetermined event occurs, the processor 520 may determine (or predict) the latency of the first link, the second link, and/or the third link and determine (or predict) the latency of the combination of the first link, the second link, and/or the third link. The predicted latency may be temporarily or non-temporarily stored in a memory (for example, the memory 130 of FIG. 1). The predetermined event may include various events including an event of changing the service being executed in the electronic device 500, an event of changing an application being executed in the electronic device 500, an event of changing the quality of at least one link among the first link, the second link, and/or the third link, or an event of changing the quality of a signal received by the electronic device 500.

The processor 520 may identify latency for performing the currently executed (implemented) service (or application). According to an embodiment, the processor 520 may identify latency for the service by receiving the latency for the currently executed service from the application processor 120. Alternatively, the processor 520 may identify the latency for performing the service (service latency), based on information on the currently executed service. For example, the processor 520 may identify the latency for performing the service, based on information on the service (or identification information) stored in the memory 130 and data to which the latency is mapped. The memory 130 may store instructions that, when executed by the at least one processor 520, cause the at least one processor 520 to execute operations described herein.

The processor 520 may activate or deactivate at least some links among the plurality of links, based on the latency for performing the service and the latency of each of the plurality of links (or a combination of the plurality of links). The latency of each of the plurality of links (or the combination of the plurality of links) and the latency for performing the service may be identified based on the uplink through which the electronic device 500 transmits data to the AP 320 or the downlink through which the electronic device 500 receives data from the AP 320. The latency of each of the plurality of links (or the combination of the plurality of links) and the latency for performing the service may be measured based on the uplink through which the electronic device 500 transmits data to the AP 320, and based thereon, the latency of each of the plurality of links (or the combination of the plurality of links) for the downlink through which the AP 320 transmits data to the electronic device 500 and the latency for performing the service may be predicted.

The processor 520 may maintain the link or the combination of the plurality of links which can implement the latency shorter than the latency for performing the service as the active state (or switch the same to the active state) and switch the remaining links to the inactive state (or maintain the same as the inactive state).

In description of [Table 1] by way of example, the processor 520 may identify that the latency for performing the service is shorter than the latency of the first link and the third link and determine to perform the service by using the combination of the second link and the third link which implements the latency shorter than the latency of the first link and the third link. The processor 520 may control the plurality of links by maintaining (or switch) the second link and the third link as (to) the active state and switching (or maintaining) the first link. The processor 520 may reduce power consumption of the electronic device 500 by switching at least some links to the inactive state, based on the latency of the link or the combination of links.

The processor 520 may generate a TID-to link mapping frame to be included in a frame (for example, a beacon frame or an action frame) to be transmitted to the AP 320 as a part of the operation of activating the link. The processor 520 may activate the link by controlling the communication circuit 510 to transmit the TID-to link mapping frame in which a traffic identifier (TID) of data to be transmitted through the activated link and identification information of the link to be activated are mapped to the AP 320.

The processor 520 may generate a TID-to link mapping frame to be included in a frame (for example, a beacon frame or an action frame) to be transmitted to the AP 320 as a part of the operation of deactivating the link. The processor 520 may deactivate the link by controlling the communication circuit 510 to transmit a TID-to link mapping frame configured such that the link to be deactivated is not mapped to the TID to the AP 320.

The processor 520 may control the communication circuit 510 to perform short-range wireless communication between the electronic device 500 and the external electronic device 401. For example, the processor 520 may control the communication circuit 510 to perform short-range wireless communication between the electronic device 500 and the external electronic device 401 in a situation where the electronic device 500 performs a service by the external electronic device 401 (for example, data sharing, content sharing, or a service (for example, a second screen) using an element (for example, a display) of the external electronic device 401).

The processor 520 may perform short-range wireless communication (for example, tunneled direct link setup (TDLS)) with the external electronic device 401 through the AP 320 or may perform direct communication (device to device (D2D) (for example, Wi-Fi direct or neighbor awareness network (NAN)) without passing through the AP 320.

The processor 520 may determine whether to perform short-range wireless communication through the AP 320 or direct communication between the external electronic device 401 and the electronic device 500, based on the latency of the link or the combination of the links.

The processor 520 may identify latency for performing the service (or application) currently executed (performed). According to an embodiment, the processor 520 may identify latency for the service by receiving the latency for the currently executed service from the application processor 120. Alternatively, the processor 520 may identify the latency for performing the service, based on information on the currently executed service. For example, the processor 520 may identify the latency for performing the service, based on information on the service (or identification information) stored in the memory 130 and data to which the latency is mapped.

The processor 520 may determine whether to perform short-range wireless communication through the AP 320 or to perform direct communication between the external electronic device 401 and the electronic device 500, based on the latency for performing the service and the latency of each of the plurality of links (or the combination of the plurality of links).

The processor 520 may determine to perform the direct communication between the external electronic device 401 and the electronic device 500, based on identification that there is no link or no combination of links which can implement the latency shorter than the latency for performing the service.

When the communication circuit 510 has capability to simultaneously make the connection between the AP 320 and the electronic device 500 and the connection between the external electronic device 401 and the electronic device 500, the processor 520 may configure the direct communication between the external electronic device 401 and the electronic device 500 without releasing the connection between the AP 320 and the electronic device 500.

When the communication circuit 510 does not have the capability to simultaneously make the connection between the AP 320 and the electronic device 500 and the connection between the external electronic device 401 and the electronic device 500, the processor 520 may release the connection between the AP 320 and the electronic device 500 and configure the direct communication between the external electronic device 401 and the electronic device 500.

The processor 520 may perform short-range wireless communication through the AP 320, based on identification that there is the link or the combination of links which can implement the latency shorter than the latency for performing the service.

The processor 520 may determine whether to perform short-range wireless communication using another AP that is not the AP 320, based on the latency of the link or the combination of links.

The processor 520 may identify latency for performing the service (or application) currently executed (performed). According to an embodiment, the processor 520 may identify latency for the service by receiving the latency for the currently executed service from the application processor 120. Alternatively, the processor 520 may identify the latency for performing the service, based on information on the currently executed service. For example, the processor 520 may identify the latency for performing the service, based on information on the service (or identification information) stored in the memory 130 and data to which the latency is mapped.

The processor 520 may determine whether to perform short-range wireless communication using another AP that is not the AP 320, based on the latency for performing the service and the latency of each of the plurality of links (or the combination of the plurality of links).

The processor 520 may determine to perform short-range wireless communication using another AP which is not the AP 320 and perform a procedure for the connection with the other AP, based on identification that there is no link or no combination of links which can implement the latency shorter than the latency for performing the service.

The processor 520 may determine to perform short-range wireless communication using the AP 320 and maintain the connection with the AP 320, based on identification that there is the link or the combination of links which can implement the latency shorter than the latency for performing the service.

Figure 6:
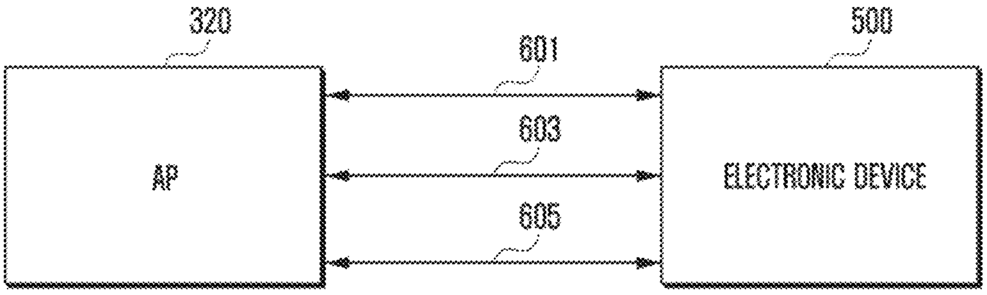
FIG. 6 illustrates an embodiment in which the electronic device controls a plurality of links according to various embodiments of the disclosure.

FIG. 6 illustrates an embodiment in which the electronic device controls a plurality of links according to various embodiments of the disclosure.

Referring to FIG. 6, an electronic device (for example, the electronic device 500 of FIG. 5) may be connected to an AP (for example, the external electronic device 320 of FIG. 3) through a first link 601 (for example, the first link 331 of FIG. 3), a second link 602 (for example, the second link 332 of FIG. 3), and a third link 603.

When the electronic device 500 performs the service that requires relatively long latency, the service may be smoothly performed without activation of all of the first link 601, the second link 602, and/or the third link 603. Accordingly, the electronic device 500 may deactivate at least some links, based on the latency for performing the service and the latency of a combination of the first link 601, the second link 602, and/or the third link 603.

The electronic device 500 may determine (or predict) the latency of each of the plurality of links between the AP 320 and the electronic device 500 as well as the first link 601. The electronic device 500 may determine the latency of each of the plurality of links and determine the latency of at least one link and a combination of two or more links among the plurality of links.

When determining the latency of the combination of two or more links, the electronic device 500 may determine a harmonic mean of the latency of links included in the combination of the links as the latency of the combination of the links. The harmonic mean of the latency of the links may mean a reciprocal number of the sum of reciprocal numbers of the latency of the links.

When the electronic device 500 can be connected to the AP 320 through the first link 601, the second link 602, and/or the third link 603, the electronic device 500 may determine the latency of the combination of links as shown in [Table 1] mentioned in the detailed description of FIG. 5.

When a predetermined period or a predetermined event occurs, the electronic device 500 may determine (or predict) the latency of the second link 602 and/or the third link 603 and determine (or predict) the latency of the combination of the first link 601, the second link 602, and/or the third link 603. The predicted latency may be temporarily or non-temporarily stored in a memory (for example, the memory 130 of FIG. 1).

The electronic device 500 may identify the latency for performing the currently executed (or performed) service (or application). According to an embodiment, the electronic device 500 may identify the latency for the service by receiving the latency for the currently executed service from the application processor 120. Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

The electronic device 500 may activate or deactivate at least some links among the plurality of links, based on the latency for performing the service and the latency of each of the plurality of links (or the combination of the plurality of links).

The electronic device 500 may maintain the link or the combination of the plurality of links that can implement the latency shorter than the latency for performing the service as the active state (or switch the same to the active state) and switch the remaining links to the inactive state (or maintain the same as the inactive state).

In description of [Table 1] by way of example, the electronic device 500 may identify that the latency for performing the service is shorter than the latency of the first link 601 and the third link 603 and determine to perform the service by using the combination of the second link 602 and the third link 603 which implements the latency shorter than the latency of the first link 601 and the third link 603. The electronic device 500 may control the plurality of links by maintaining (or switching) the second link 602 and the third link 603 as (to) the active state and switching (or maintain) the first link 601 to (or as) the inactive state. The electronic device 500 may reduce power consumed by the electronic device 500 by switching at least some links to the inactive state, based on the latency of the link or the combination of links.

The electronic device 500 may generate a TID-to link mapping frame to be included in a frame (for example, a beacon frame or an action frame) to be transmitted to the AP 320 as a part of the operation of activating the link. The electronic device 500 may activate the link by controlling the communication circuit 510 to transmit the TID-to link mapping frame in which a traffic identifier (TID) of data to be transmitted through the activated link and identification information of the link to be activated are mapped to the AP 320.

The electronic device 500 may generate a TID-to link mapping frame to be included in a frame (for example, a beacon frame or an action frame) to be transmitted to the AP 320 as a part of the operation of deactivating the link. The electronic device 500 may deactivate the link by controlling the communication circuit 510 to transmit a TID-to link mapping frame configured such that the link to be deactivated is not mapped to the TID to the AP 320.

Figure 7:
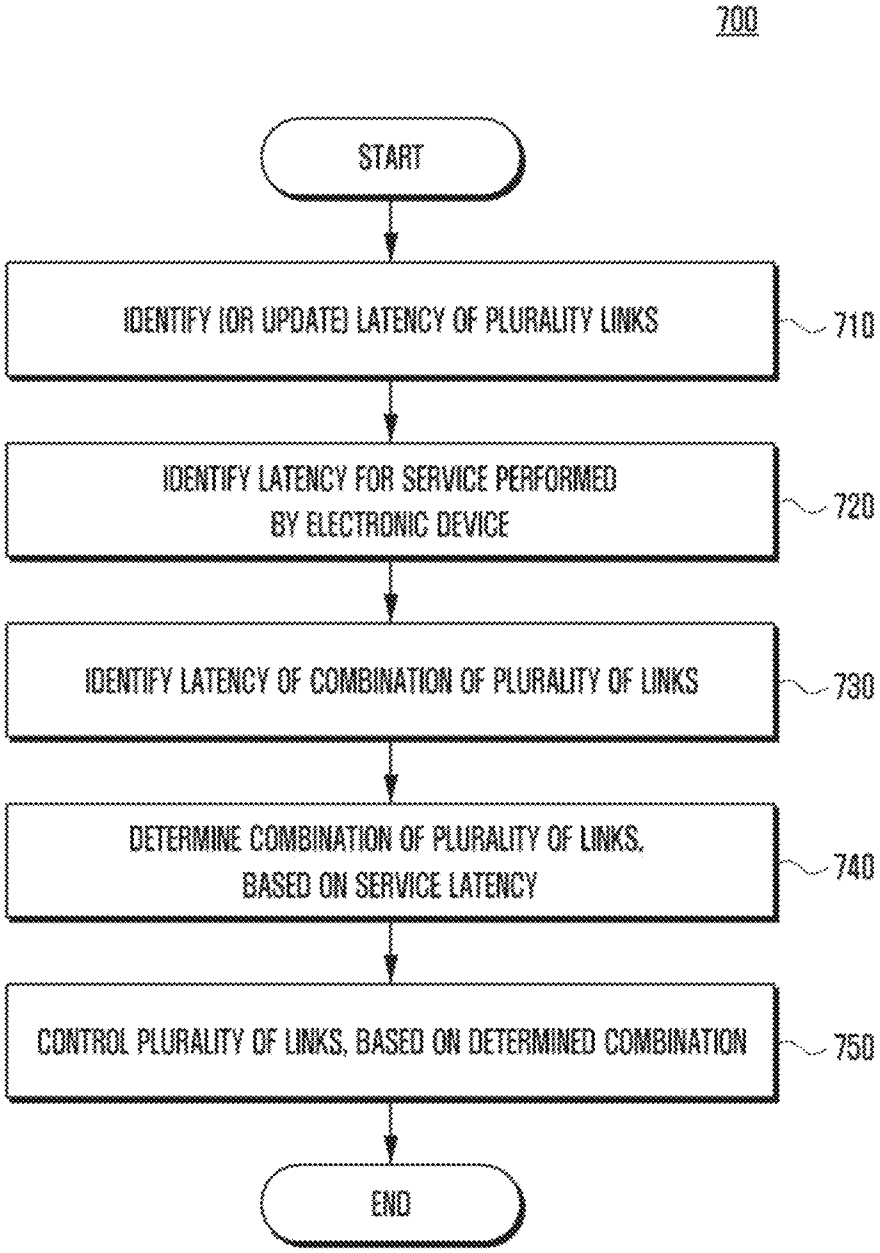
FIG. 7 is an operation flowchart illustrating an operation in which the electronic device controls a plurality of links, based on latency of the plurality of links according to various embodiments of the disclosure.

FIG. 7 is an operation flowchart illustrating an operation 700 in which the electronic device controls a plurality of links, based on latency of the plurality of links according to various embodiments of the disclosure.

Referring to FIG. 7, an electronic device (for example, the electronic device 500 of FIG. 5) may identify (or update) latency of a plurality of links connected between an AP (for example, the electronic device 320 of FIG. 3) and the electronic device 500 in operation 710.

The electronic device 500 may determine (or predict) latency of each of the plurality of links between the AP 320 and the electronic device 500. The electronic device 500 may determine the latency of each of the plurality of links and determine the latency of at least one link and a combination of two or more links among the plurality of links.

The electronic device 500 may monitor a first link (for example, the first link 601 of FIG. 6) and determine a contention time per time unit of counters, based on a first time corresponding to a time during which the first link 601 is monitored and a second time corresponding to a time during which an external electronic device (for example, the first electronic device 401 of FIG. 4) occupies the first link.

The electronic device 500 may determine the contention time of data transmission through the first link 601, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the first link 601.

The electronic device 500 may determine the latency of the first link 601, based on the contention time of the data transmission through the first link 601 and the transmission time of data through the first link 601.

The electronic device 500 may monitor a second link (for example, the second link 602 of FIG. 6) and determine a contention time per time unit of counters, based on a first time corresponding to a time during which the second link 602 is monitored and a second time corresponding to a time during which the external electronic device (for example, the first electronic device 401 of FIG. 4) occupies the second link.

The electronic device 500 may determine the contention time of data transmission through the second link 602, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the second link 602.

The electronic device 500 may determine the latency of the second link 602, based on the contention time of the data transmission through the second link 602 and the transmission time of data through the second link 602.

The electronic device 500 may monitor a third link (for example, the third link 603 of FIG. 6) and determine a contention time per unit time of counters, based on a first time corresponding to a time during which the third link 603 is monitored and a second time corresponding to a time during which the external electronic device (for example, the first electronic device 401 of FIG. 4) occupies the third link 603.

The electronic device 500 may determine the contention time of data transmission through the third link 603, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the third link 603.

The electronic device 500 may determine the latency of the third link 603, based on the contention time of the data transmission through the third link 603 and the transmission time of data through the third link 603.

The electronic device 500 may identify the latency for performing the service performed by the electronic device 500 in operation 720.

The electronic device 500 may identify the latency for performing the currently executed (or performed) service (or application). According to an embodiment, the electronic device 500 may identify the latency for the service by receiving the latency for the currently executed service from the application processor 120. Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

The electronic device 500 may identify the latency of the combination of the plurality of links in operation 730.

The electronic device 500 may identify the latency of the combination of the plurality of links according to generation of various events. The various events may include various events including an event for changing the service executed in the electronic device 500, an event for changing the application executed in the electronic device 500, an event for changing the quality of at least one link among the first link, the second link, and/or the third link, or an event for changing the equality of a signal received by the electronic device 500.

Alternatively, the electronic device 500 may identify the latency of the combination of the plurality of links in every period.

The electronic device 500 may identify latency that may be generated when data is transmitted simultaneously using the first link 601 and the second link 602, latency that may be generated when data is transmitted simultaneously using the first link 601 and the third link 603, latency that may be generated when data is transmitted simultaneously using the second link 602 and the third link 603, and/or latency that may be generated when data is transmitted simultaneously using the first link 601, the second link 602, and the third link 603.

When determining the latency of the combination of two or more links, the electronic device 500 may determine a harmonic mean of the latency of links included in the combination of the links as the latency of the combination of the links. The harmonic mean of the latency of the links may mean a reciprocal number of the sum of reciprocal numbers of the latency of the links.

The electronic device 500 may determine a combination of the plurality of links, based on the latency for performing the service in operation 740.

The electronic device 500 may determine a combination of links having latency shorter than the latency for performing the service. When determining a combination of links, the electronic device 500 may determine (or select) a combination of links having the lowest power consumption (or a combination of links having a low frequency band) among combinations of links having latency shorter than the latency for performing the service if the number of combinations of links having latency shorter than the latency for performing the service is plural among the latency that can be implemented by combinations of links.

The electronic device 500 may control the plurality of links, based on the determined combination of links in operation 750.

The electronic device 500 may activate or deactivate at least some links among the plurality of links, based on the latency for performing the service and the latency of each of the plurality of links (or the combination of the plurality of links).

The electronic device 500 may maintain the link or the combination of the plurality of links that can implement the latency shorter than the latency for performing the service as the active state (or switch the same to the active state) and switch the remaining links to the inactive state (or maintain the same as the inactive state).

In description of [Table 1] by way of example, the electronic device 500 may identify that the latency for performing the service is shorter than the latency of the first link 601 and the third link 603 and determine to perform the service by using the combination of the second link 602 and the third link 603 which implements the latency shorter than the latency of the first link 601 and the third link 603. The electronic device 500 may control the plurality of links by maintaining (or switching) the second link 602 and the third link 603 as (to) the active state and switching (or maintain) the first link 601 to (or as) the inactive state. The electronic device 500 may reduce power consumed by the electronic device 500 by switching at least some links to the inactive state, based on the latency of the link or the combination of links.

The electronic device 500 may generate a TID-to link mapping frame to be included in a frame (for example, a beacon frame or an action frame) to be transmitted to the AP 320 as a part of the operation of activating the link. The electronic device 500 may activate the link by controlling the communication circuit 510 to transmit the TID-to link mapping frame in which a traffic identifier (TID) of data to be transmitted through the activated link and identification information of the link to be activated are mapped to the AP 320.

The electronic device 500 may generate a TID-to link mapping frame to be included in a frame (for example, a beacon frame or an action frame) to be transmitted to the AP 320 as a part of the operation of deactivating the link. The electronic device 500 may deactivate the link by controlling the communication circuit 510 to transmit a TID-to link mapping frame configured such that the link to be deactivated is not mapped to the TID to the AP 320.

Figure 8:
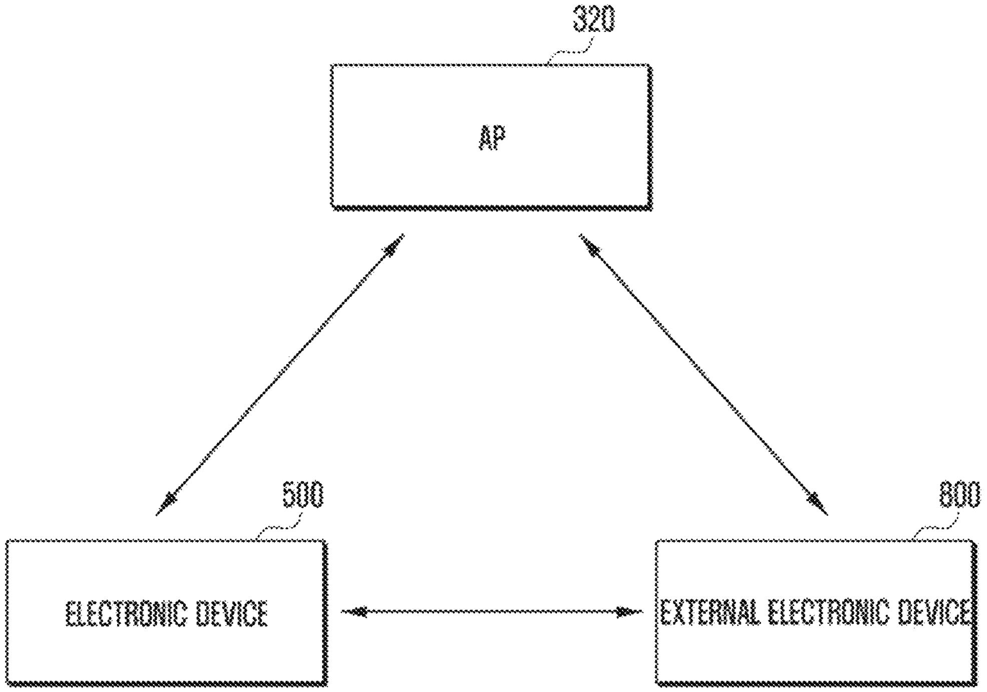
FIG. 8 illustrates an electronic device, an external electronic device, and an AP according to various embodiments of the disclosure.

FIG. 8 illustrates an electronic device, an external electronic device, and an AP according to various embodiments of the disclosure.

Referring to FIG. 8, an electronic device (for example, the electronic device 500 of FIG. 5) may be connected to an AP (for example, the external electronic device 320 of FIG. 3) through a first link (for example, the first link 601 of FIG. 6), a second link (for example, the second link 602 of FIG. 6), and a third link (for example, the third link 603 of FIG. 6). An external electronic device 800 (for example, the first electronic device 401 of FIG. 4A) may be connected to the AP 320.

The electronic device 500 may perform short-range wireless communication between the electronic device 500 and the external electronic device 800. For example, in a situation where the electronic device 500 performs a service (for example, data sharing, content sharing, or a service (for example, a second screen) using an element (for example, a display) of the external electronic device 800) by the external electronic device 800, the electronic device 500 may transmit or receive data for the service through short-range wireless communication between the electronic device 500 and the external electronic device 800.

When performing short-range wireless communication with the external electronic device 800, the electronic device 500 may perform short-range wireless communication (for example, tunneled direct link setup (TDLS)) with the external electronic device 800 through the AP 320 or perform direct communication (device to device (D2D) (for example, Wi-Fi direct or neighbor awareness network (NAN)) through passing through the AP 320.

The electronic device 500 may determine whether to perform short-range wireless communication through the AP 320 or perform direct communication between the external electronic device 800 and the electronic device 500, based on the latency of the link or the combination of links.

The electronic device 500 may identify the latency for performing the currently executed (or performed) service (or application). According to an embodiment, the electronic device 500 may identify the latency for the service by receiving the latency for the currently executed service from the application processor 120. Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

When transmitting or receiving data through one link (for example, multi-link operation (NON-MLO)), the electronic device 500 may determine whether to perform short-range wireless communication through the AP 320 or perform direct communication between the external electronic device 800 and the electronic device 500, based on the latency for performing the service and the latency of the activated link.

The electronic device 500 may determine to perform direct communication between the external electronic device 800 and the electronic device 500, based on identification that the latency of the activated link is longer than the latency for performing the service.

When the communication circuit 510 can simultaneously make the connection between the AP 320 and the electronic device 500 and the connection between the external electronic device 800 and the electronic device 500, the electronic device 500 may configure direct communication between the external electronic device 800 and the electronic device 500 without releasing the connection between the AP 320 and the electronic device 500.

When the communication circuit 510 cannot simultaneously make the connection between the AP 320 and the electronic device 500 and the connection between the external electronic device 800 and the electronic device 500, the electronic device 500 may configure direct communication between the AP 320 and the electronic device 500 and the connection between the external electronic device 800 and the electronic device 500.

The electronic device 500 may perform short-range wireless communication through the AP 320, based on identification that the latency of the activated link is shorter than the latency for performing the service. The short-range wireless communication through the AP 320 may be short-range wireless communication using the activated link.

The electronic device 500 may determine whether to perform short-range wireless communication through the AP 320 or perform direct communication between the external electronic device 800 and the electronic device 500, based on the latency for performing the service and latency of each of the plurality of links (or the combination of the plurality of links).

Alternatively, when latency of the link between the external electronic device 800 and the AP 320 can be acquired, the electronic device 500 may determine whether to perform short-range wireless communication through the AP 320 or perform direct communication between the external electronic device 800 and the electronic device 500, based on the latency for performing the service, the latency of each of the plurality of links (or the combination of the plurality of links), and/or the latency of the link between the external electronic device 800 and the AP 320.

The electronic device 500 may determine to perform the direct communication between the external electronic device 800 and the electronic device 500, based on identification that there is no link or no combination of links which can implement the latency shorter than the latency for performing the service.

When the communication circuit 510 has capability to simultaneously make the connection between the AP 320 and the electronic device 500 and the connection between the external electronic device 800 and the electronic device 500, the electronic device 500 may configure direct communication between the external electronic device 800 and the electronic device 500 without releasing the connection between the AP 320 and the electronic device 500.

When the communication circuit 510 does not have capability to simultaneously make the connection between the AP 320 and the electronic device 500 and the connection between the external electronic device 800 and the electronic device 500, the electronic device 500 may release the connection between the AP 320 and the electronic device 500 and configure direct communication between the external electronic device 800 and the electronic device 500.

The electronic device 500 may perform short-range wireless communication through the AP 320, based on identification that there is the link or the combination of links that can implement the latency shorter than the latency for performing the service.

Maintaining direct communication between the electronic device 500 and the external electronic device 800 in a situation where data transmission or reception between the external electronic device 800 and the electronic device 500 is not frequently generated may cause unnecessary power consumption of the electronic device 500. Accordingly, the electronic device 500 may reduce power consumption due to direct communication between devices by performing short-range wireless communication through the AP 320 with the external electronic device 800, based on identification that there is the link or the combination of links that can implement the latency shorter than the latency for performing the service.

Figure 9A:
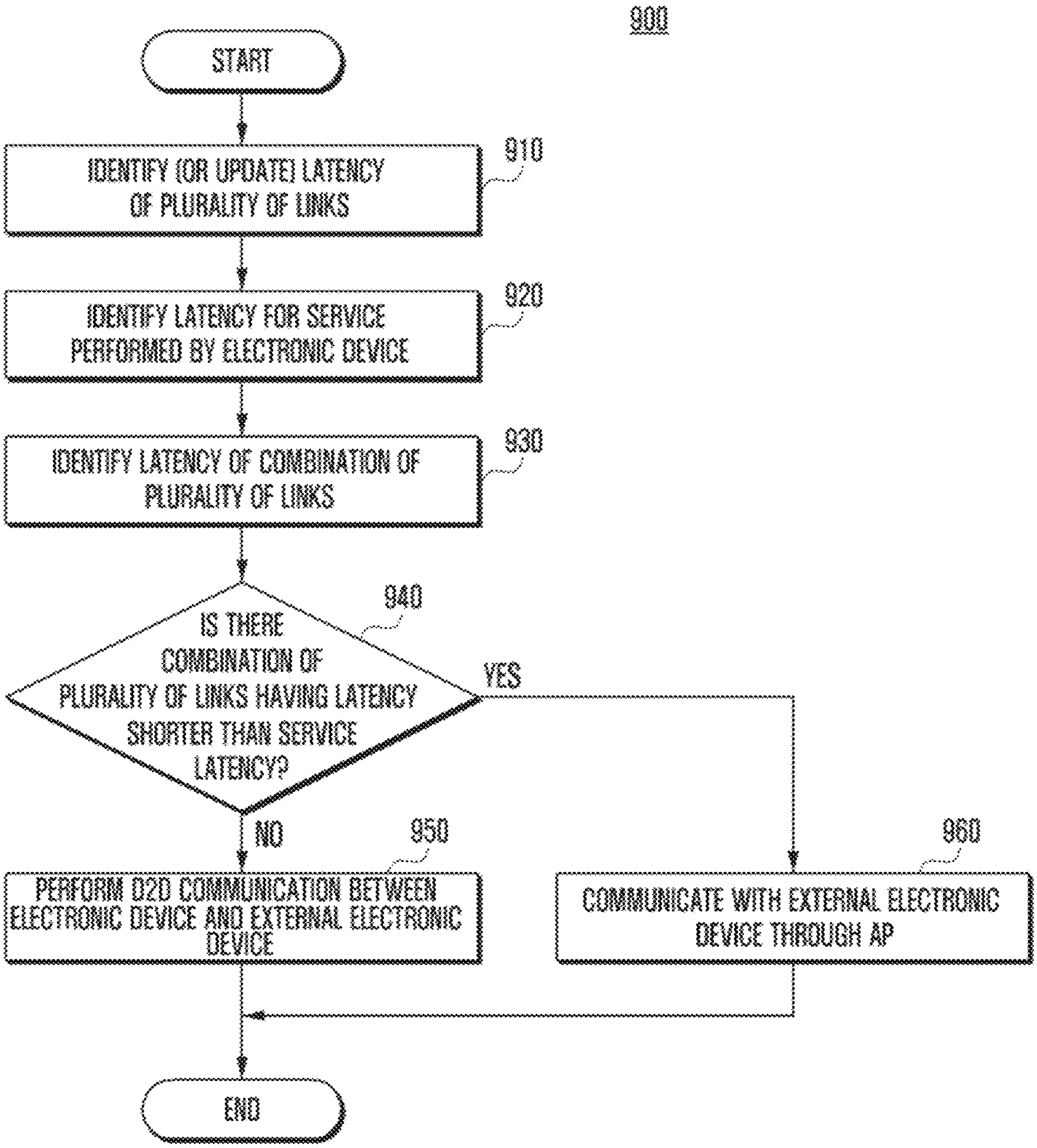
FIG. 9A is an operation flowchart illustrating an operation in which the electronic device determines whether to transmit or receive data through the AP or transmit or receive data through D2D communication with the external electronic device, based on latency of a combination of a plurality of links according to various embodiments of the disclosure.

FIG. 9A is an operation flowchart illustrating an operation in which the electronic device determines whether to transmit or receive data through the AP or transmit or receive data through D2D communication with the external electronic device, based on latency of a combination of a plurality of links according to various embodiments of the disclosure.

Referring to FIG. 9A, an electronic device (for example, the electronic device 500 of FIG. 5) may identify (or update) latency of a plurality of links connected between an AP (for example, the external electronic device 320 of FIG. 3) and the electronic device 500 in operation 910.

The electronic device 500 may determine (or predict) latency of each of the plurality of links between the AP 320 and the electronic device 500. The electronic device 500 may determine the latency of each of the plurality of links and determine the latency of at least one link and a combination of two or more links among the plurality of links.

The electronic device 500 may monitor a first link (for example, the first link 601 of FIG. 6) and determine a contention time per time unit of counters, based on a first time corresponding to a time during which the first link 601 is monitored and a second time corresponding to a time during which an external electronic device (for example, the first electronic device 401 of FIG. 4) occupies the first link.

The electronic device 500 may determine the contention time of data transmission through the first link 601, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the first link 601.

The electronic device 500 may monitor a second link (for example, the second link 602 of FIG. 6) and determine a contention time per time unit of counters, based on a first time corresponding to a time during which the second link 602 is monitored and a second time corresponding to a time during which an external electronic device (for example, the first electronic device 401 of FIG. 4) occupies the second link.

The electronic device 500 may determine the contention time of data transmission through the second link 602, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the second link 602.

The electronic device 500 may monitor a third link (for example, the third link 603 of FIG. 6) and determine a contention time per unit time of counters, based on a first time corresponding to a time during which the third link 603 is monitored and a second time corresponding to a time during which the external electronic device (for example, the first electronic device 401 of FIG. 4) occupies the third link 603.

The electronic device 500 may determine the contention time of data transmission through the third link 603, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the third link 603.

The electronic device 500 may identify the latency for performing the service performed by the electronic device 500 in operation 920.

The electronic device 500 may identify the latency for performing the currently executed (or performed) service (or application). According to an embodiment, the electronic device 500 may identify the latency for the service by receiving the latency for the currently executed service from the application processor 120. Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

The electronic device 500 may identify the latency of the combination of the plurality of links in operation 930.

The electronic device 500 may identify latency that may be generated when data is transmitted simultaneously using the first link 601 and the second link 602, latency that may be generated when data is transmitted simultaneously using the first link 601 and the third link 603, latency that may be generated when data is transmitted simultaneously using the second link 602 and the third link 603, and/or latency that may be generated when data is transmitted simultaneously using the first link 601, the second link 602, and the third link 603.

When determining the latency of the combination of two or more links, the electronic device 500 may determine a harmonic mean of the latency of links included in the combination of the links as the latency of the combination of the links. The harmonic mean of the latency of the links may mean a reciprocal number of the sum of reciprocal numbers of the latency of the links.

The electronic device 500 may identify whether is a combination of a plurality of links having latency shorter than the latency for performing the service in operation 940.

The electronic device 500 may perform inter-device direct communication (D2D communication) between the electronic device 500 and the external electronic device 800 in operation 950, based on identification (operation 940-N) that there is no combination of the plurality of links having latency shorter than the latency for performing the service.

When the communication circuit 510 has capability to simultaneously make the connection between the AP 320 and the electronic device 500 and the connection between the external electronic device 800 and the electronic device 500, the electronic device 500 may configure direct communication between the external electronic device 800 and the electronic device 500 without releasing the connection between the AP 320 and the electronic device 500.

When the communication circuit 510 does not have capability to simultaneously make the connection between the AP 320 and the electronic device 500 and the connection between the external electronic device 800 and the electronic device 500, the electronic device 500 may release the connection between the AP 320 and the electronic device 500 and configure direct communication between the external electronic device 800 and the electronic device 500.

The electronic device 500 may communication with the external electronic device 800 through the AP 320 in operation 960, based on identification (operation 940-Y) that there is the combination of the plurality of links having latency shorter than the latency for performing the service.

Figure 9B:
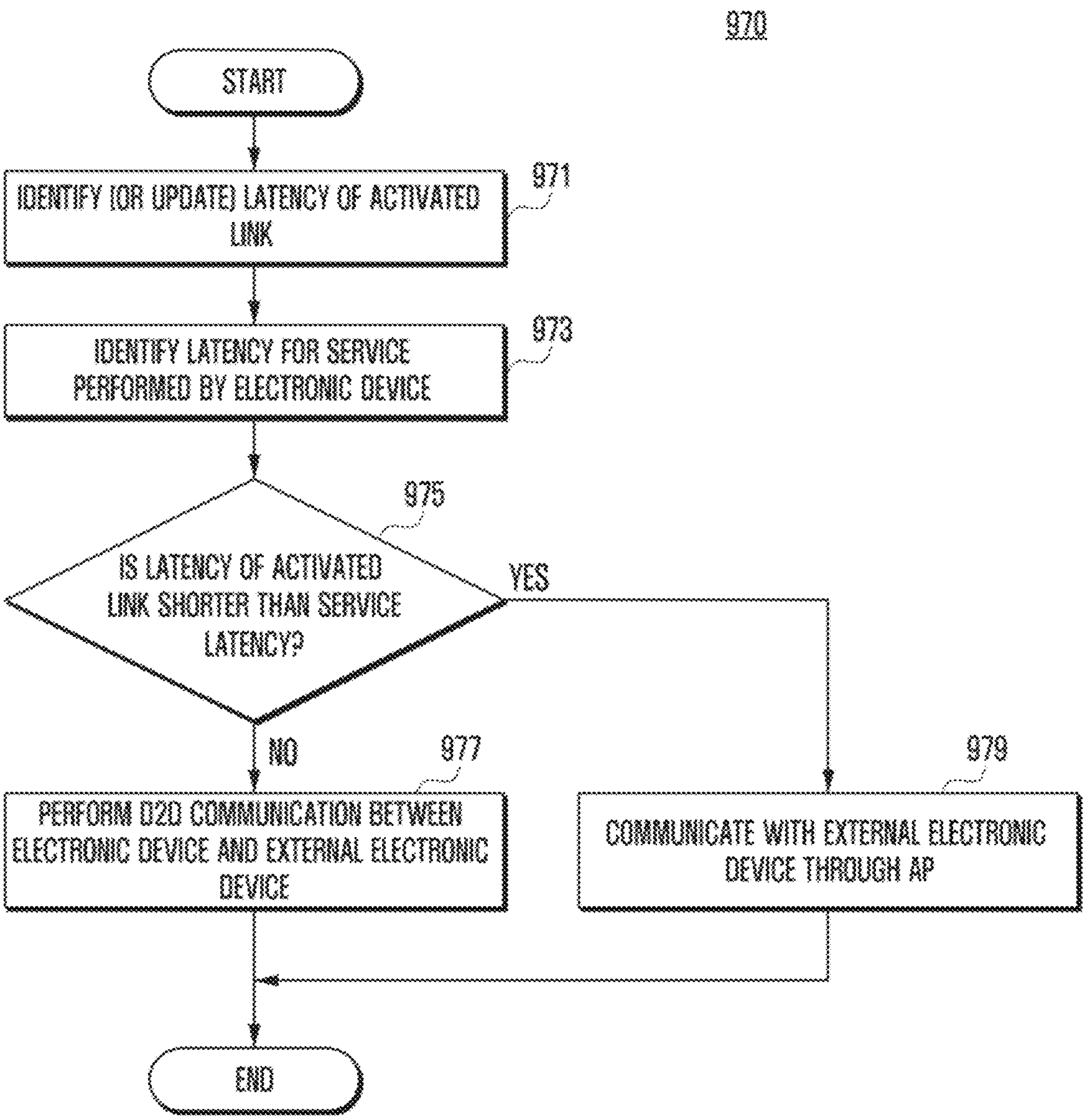
FIG. 9B is an operation flowchart illustrating an operation 970 in which the electronic device determines whether to transmit or receive data through the AP or transmit or receive data through D2D communication with the external electronic device, based on latency of the activated link according to various embodiments of the disclosure.

FIG. 9B is an operation flowchart illustrating an operation 970 in which the electronic device determines whether to transmit or receive data through the AP or transmit or receive data through D2D communication with the external electronic device, based on latency of the activated link according to various embodiments of the disclosure.

Referring to FIG. 9B, an electronic device (for example, the electronic device 500 of FIG. 5) may identify (or update) latency of an activated link (for example, the first link 601 of FIG. 6) connected between an AP (for example, the external electronic device 320 of FIG. 3) and the electronic device 500 in operation 971.

The electronic device 500 may monitor a first link (for example, the first link 601 of FIG. 6) and determine a contention time per time unit of counters, based on a first time corresponding to a time during which the first link 601 is monitored and a second time corresponding to a time during which an external electronic device (for example, the first electronic device 401 of FIG. 4) occupies the first link.

The electronic device 500 may determine the contention time of data transmission through the first link 601, based on a predetermined number of counters (for example, an average number of counters that can be allocated by the electronic device 500) and the configure a value obtained by multiplying the predetermined number of counters and the contention time per unit time of the counters as the contention time of the data transmission through the first link 601.

The electronic device 500 may determine a transmission time between a time point at which data transmission starts and a time point at which data transmission is completed as a part of the operation for determining latency.

The electronic device 500 may identify latency of the first link 601 (or the activated link), based on the contention time of data transmission through the first link 601 and the transmission time of data transmission through the first link 601.

The electronic device 500 may identify the latency for performing the service performed by the electronic device 500 in operation 973.

The electronic device 500 may identify the latency for performing the currently executed (or performed) service (or application). According to an embodiment, the electronic device 500 may identify the latency for the service by receiving the latency for the currently executed service from the application processor 120. Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

The electronic device 500 may identify whether the latency of the activated link is shorter than the latency for performing the service in operation 975.

The electronic device 500 may perform inter-device direct communication (D2D communication) between the electronic device 500 and the external electronic device 800 in operation 977, based on that the latency of the activated link is longer than the latency for performing the service (operation 975-No).

When the communication circuit 510 can simultaneously make the connection between the AP 320 and the electronic device 500 and the connection between the external electronic device 800 and the electronic device 500, the electronic device 500 may configure direct communication between the external electronic device 800 and the electronic device 500 without releasing the connection between the AP 320 and the electronic device 500.

When the communication circuit 510 cannot simultaneously make the connection between the AP 320 and the electronic device 500 and the connection between the external electronic device 800 and the electronic device 500, the electronic device 500 may configure direct communication between the AP 320 and the electronic device 500 and the connection between the external electronic device 800 and the electronic device 500.

The electronic device 500 may communicate with the external electronic device 800 through the AP 320, based on that the latency of the activated link is shorter than the latency for performing the service (operation 975-Yes).

Figure 10:
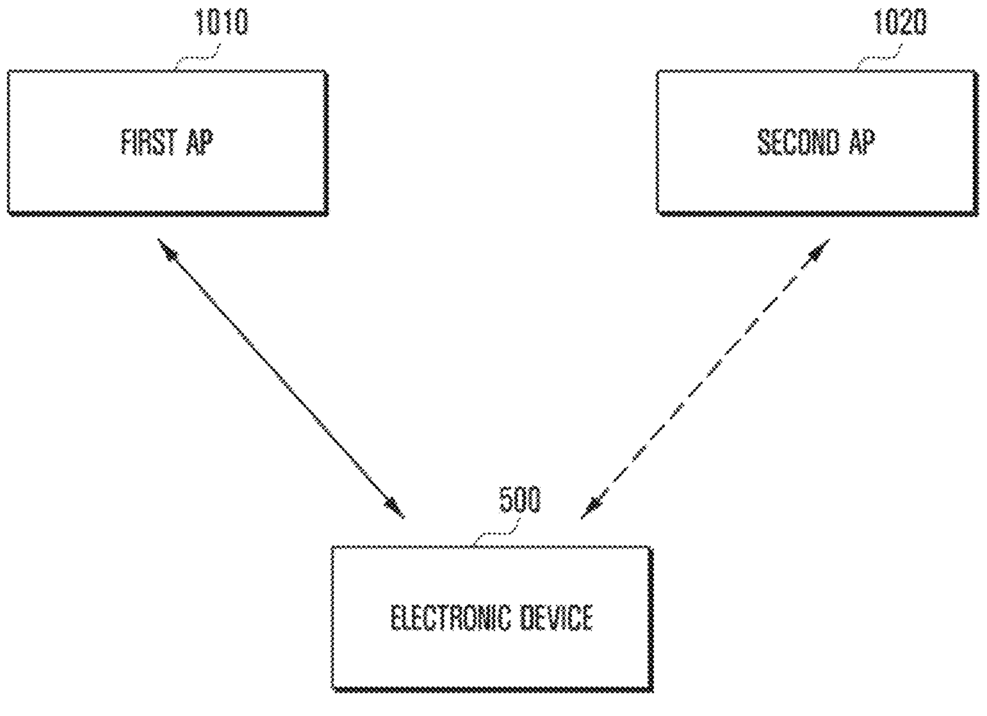
FIG. 10 illustrates an electronic device, a first AP, and a second AP according to various embodiments of the disclosure.

FIG. 10 illustrates an electronic device, a first AP, and a second AP according to various embodiments of the disclosure.

Referring to FIG. 10, an electronic device (for example, the electronic device 500 of FIG. 5) may be connected to a first AP 1010 (for example, the external electronic device 320 of FIG. 3) through a first link (for example, the first link 601 of FIG. 6), a second link (for example, the second link 602 of FIG. 6), and a third link (for example, the third link 603 of FIG. 6). A second AP 1020 may be located in an area adjacent to the first AP 1010. The electronic device 500 may not be connected to the second AP 1020.

The electronic device 500 according to an embodiment may determine whether to perform short-range wireless communication using another AP, which is not the first AP 1010, based on latency of the link or a combination of links.

The electronic device 500 may identify the latency for performing the currently executed (or performed) service (or application). According to an embodiment, the electronic device 500 may identify latency by the service. Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

The electronic device 500 may determine whether to perform short-range wireless communication using the second AP 1020 which is an AP different from the first AP 1010, based on latency for performing the service and latency of each of a plurality of links (or a combination of a plurality of links).

The electronic device 500 may determine to perform short-range wireless communication using the second AP 1020, based on identification that there is no link or no combination of links that can implement latency shorter than the latency for performing the service and perform a procedure for the connection with the second AP 1020.

Although there is no link or no combination of links that can implement latency shorter than the latency for performing the service, the electronic device 500 may maintain the connection with the first AP 1010 in a situation where a speed (or quality) of data transmission or reception through the first AP 1010 is higher than a speed (or quality) of data transmission or reception through the second AP 1020.

The electronic device 500 may determine to perform short-range wireless communication using the first AP 1010, based on identification that there is the link or the combination of links that can implement latency shorter than the latency for performing the service, and maintain the connection with the first AP 1010.

Figure 11:
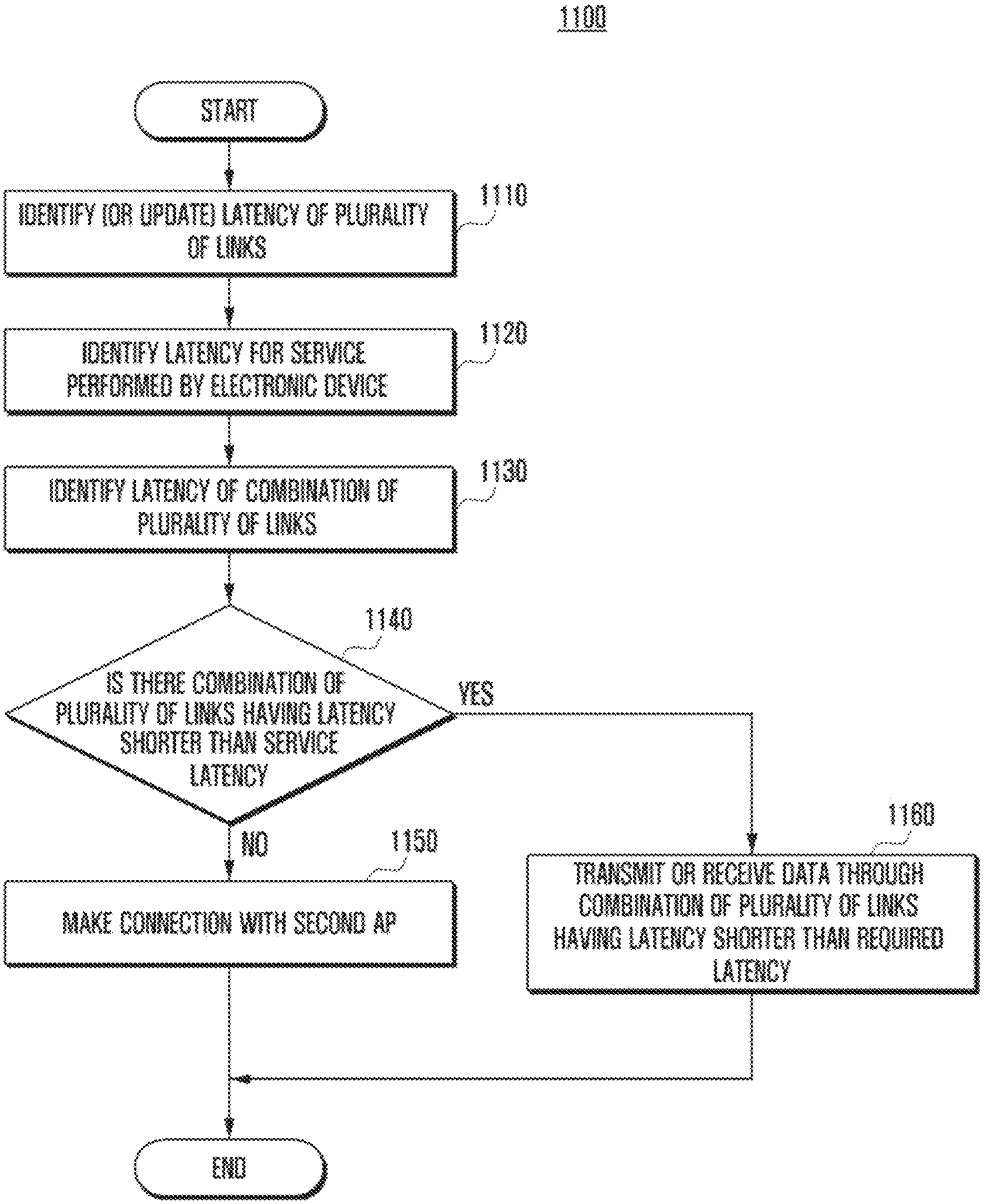
FIG. 11 is an operation flowchart illustrating an operation in which the electronic device determines whether to maintain the connection of a first AP or whether to switch the connection to a second AP, based on latency of a combination of a plurality of links according to various embodiments of the disclosure.

FIG. 11 is an operation flowchart illustrating an operation in which the electronic device determines whether to maintain the connection of a first AP or whether to switch the connection to a second AP, based on latency of a combination of a plurality of links according to various embodiments of the disclosure.

Referring to FIG. 11, an electronic device (for example, the electronic device 500 of FIG. 5) may identify (or update) latency of a plurality of links connected between a first AP (for example, the first AP 1010 of FIG. 10) and the electronic device 500 in operation 1110.

The electronic device 500 may determine (or predict) latency of each of a plurality of links between the first AP 1010 and the electronic device 500. The electronic device 500 may determine the latency of each of the plurality of links and determine the latency of at least one link and a combination of two or more links among the plurality of links.

The electronic device 500 may monitor a first link (for example, the first link 601 of FIG. 6) and determine a contention time per time unit of counters, based on a first time corresponding to a time during which the first link 601 is monitored and a second time corresponding to a time during which an external electronic device (for example, the first electronic device 401 of FIG. 4) occupies the first link.

The electronic device 500 may determine the contention time of data transmission through the first link 601, based on a predetermined number of counters (for example, an average number of counters that can be allocated by the electronic device 500) and the configure a value obtained by multiplying the predetermined number of counters and the contention time per unit time of the counters as the contention time of the data transmission through the first link 601.

The electronic device 500 may monitor a second link (for example, the second link 602 of FIG. 6) and determine a contention time per time unit of counters, based on a first time corresponding to a time during which the second link 602 is monitored and a second time corresponding to a time during which an external electronic device (for example, the first electronic device 401 of FIG. 4) occupies the second link.

The electronic device 500 may determine the contention time of data transmission through the second link 602, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the second link 602.

The electronic device 500 may monitor a third link (for example, the third link 603 of FIG. 6) and determine a contention time per unit time of counters, based on a first time corresponding to a time during which the third link 603 is monitored and a second time corresponding to a time during which the external electronic device (for example, the first electronic device 401 of FIG. 4) occupies the third link 603.

The electronic device 500 may determine the contention time of data transmission through the third link 603, based on a predetermined number of counters (for example, an average number of counters that can be allocated by the electronic device 500) and the configure a value obtained by multiplying the predetermined number of counters and the contention time per unit time of the counters as the contention time of the data transmission through the third link 603.

The electronic device 500 may identify the latency for performing the service performed by the electronic device 500 in operation 1120.

The electronic device 500 may identify the latency for performing the currently executed (or performed) service (or application). According to an embodiment, the electronic device 500 may identify the latency for the service by receiving the latency for the currently executed service from the application processor 120. Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

The electronic device 500 may identify the latency of the combination of the plurality of links in operation 1130.

The electronic device 500 may identify latency that may be generated when data is transmitted simultaneously using the first link 601 and the second link 602, latency that may be generated when data is transmitted simultaneously using the first link 601 and the third link 603, latency that may be generated when data is transmitted simultaneously using the second link 602 and the third link 603, and/or latency that may be generated when data is transmitted simultaneously using the first link 601, the second link 602, and the third link 603.

When determining the latency of the combination of two or more links, the electronic device 500 may determine a harmonic mean of the latency of links included in the combination of the links as the latency of the combination of the links. The harmonic mean of the latency of the links may mean a reciprocal number of the sum of reciprocal numbers of the latency of the links.

The electronic device 500 may identify whether is a combination of a plurality of links having latency shorter than the latency for performing the service in operation 1140.

The electronic device 500 may make the connection with a second AP (for example, the second AP 1020 of FIG. 10) in operation 1150, based on identification that there is no combination of a plurality of links having latency shorter than the latency for performing the service (operation 1140-N).

The electronic device 500 may determine to perform short-range wireless communication using the second AP 1020, based on identification that there is no link or no combination of links that can implement latency shorter than the latency for performing the service and perform a procedure for the connection with the second AP 1020.

The electronic device 500 may transmit or receive data through the combination of the plurality of links having latency shorter than the latency for performing the service in operation 1160, based on identification that there is the link or the combination of links that can implement latency shorter than the latency for performing the service (operation 1140-Y).

The electronic device 500 may determine to perform short-range wireless communication using the first AP 1010, based on identification that there is the link or the combination of links that can implement latency shorter than the latency for performing the service, and maintain the connection with the first AP 1010.

Although there is no link or no combination of links that can implement latency shorter than the latency for performing the service, the electronic device 500 may maintain the connection with the first AP 1010 in a situation where a speed (or quality) of data transmission or reception through the first AP 1010 is higher than a speed (or quality) of data transmission or reception through the second AP 1020.

Figure 12:
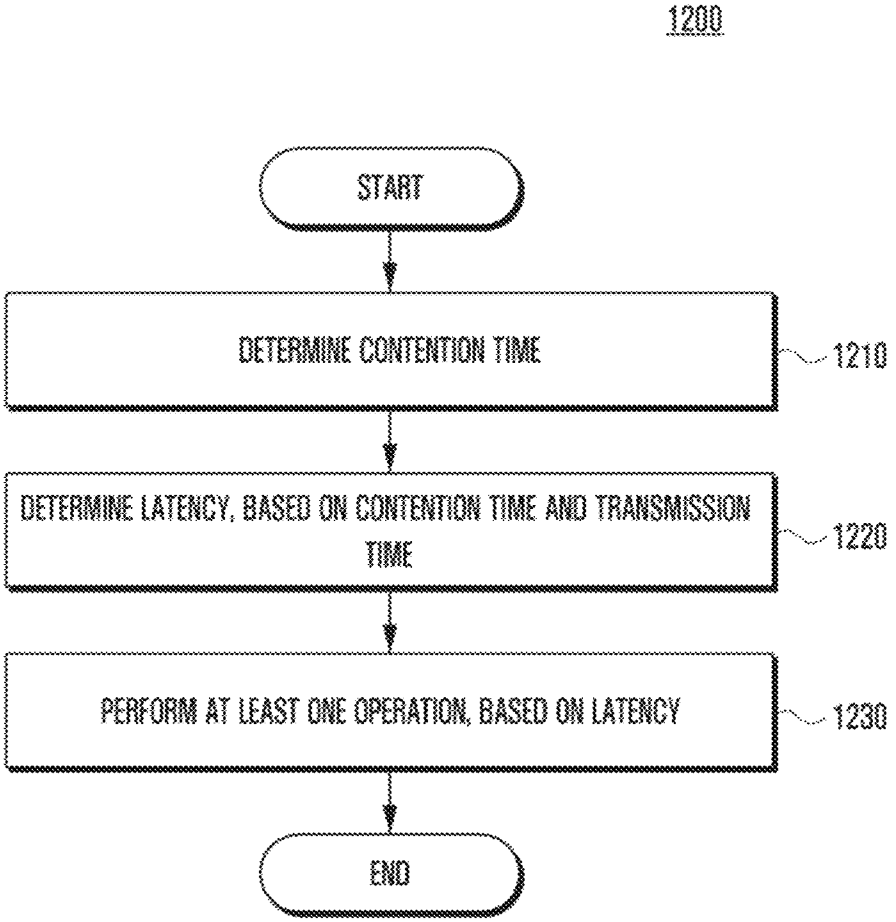
FIG. 12 is an operation flowchart illustrating a method of operating an electronic device according to various embodiments of the disclosure.

FIG. 12 is an operation flowchart illustrating a method of operating an electronic device according to various embodiments of the disclosure.

Referring to FIG. 12, an electronic device (for example, the electronic device 500 of FIG. 5) may determine a contention time in operation 1210.

The electronic device 500 may monitor a first link (for example, the first link 601 of FIG. 6) and determine a contention time per time unit of counters, based on a first time corresponding to a time during which the first link 601 is monitored and a second time corresponding to a time during which an external electronic device (for example, the first electronic device 401 of FIG. 4) occupies the first link.

The electronic device 500 may determine the contention time of data transmission through the first link 601, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the first link 601.

When the number of links connected between the electronic device 500 and the AP 320 is plural, the electronic device 500 may determine the contention time of data transmission of each of the plurality of links.

The electronic device 500 may monitor a second link (for example, the second link 602 of FIG. 6) and determine a contention time per time unit of counters, based on a first time corresponding to a time during which the second link 602 is monitored and a second time corresponding to a time during which an external electronic device (for example, the first electronic device 401 of FIG. 4) occupies the second link.

The electronic device 500 may determine the contention time of data transmission through the second link 602, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the second link 602.

The electronic device 500 may monitor a third link (for example, the third link 603 of FIG. 6) and determine a contention time per unit time of counters, based on a first time corresponding to a time during which the third link 603 is monitored and a second time corresponding to a time during which the external electronic device (for example, the first electronic device 401 of FIG. 4) occupies the third link 603.

The electronic device 500 may determine the contention time of data transmission through the third link 603, based on a predetermined number of counters (for example, an average number of counters that can be allocated by the electronic device 500) and the contention time per time unit of the counters. For example, the electronic device 500 may configure a value obtained by multiplying the predetermined number of counters and the contention time per unit time of the counters as the contention time of the data transmission through the third link 603.

The electronic device 500 may determine latency, based on the contention time and the transmission time in operation 1220.

The electronic device 500 may determine the latency of the first link 601, based on the contention time of the data transmission through the first link 601 and the transmission time of data through the first link 601.

The electronic device 500 may determine a transmission time between a time point at which data transmission starts and a time point at which data transmission is completed as a part of the operation for determining latency.

When determining the transmission time, the electronic device 500 may determine the transmission time, based on the size of data to be transmitted and an uplink reference data rate of the first link 601. The electronic device 500 may determine the transmission time by dividing the size of data to be transmitted by the data rate.

When determining the transmission time, the electronic device 500 may determine the transmission time, based on the type of service being performed by the electronic device 500 or the type of data. For example, when the service being performed by the electronic device 500 is a service for transmitting relatively large volume of data, the electronic device 500 may determine the transmission time by configuring the data size to be large. When the type of data to be transmitted by the electronic device 500 is relatively large in capacity, the electronic device 500 may determine the transmission time by configuring the data size to be large The electronic device 500 may determine the latency, based on the contention time and the transmission time. The electronic device 500 may determine the latency by adding the contention time and the transmission time.

When determining the latency, the electronic device 500 may determine the latency, based on a success rate of data transmission. Even though data is transmitted for a time obtained by adding the contention time and the transmission time, the AP 320 may fail in receiving the data for various reasons, and when the AP 320 fails in receiving the data, the electronic device 500 should perform contention with the external electronic device 401 to transmit the data again and transmit the data after a timer expires. Accordingly, the processor 520 may determine the latency by dividing the value obtained by adding the contention time and the transmission time by the success rate of the data transmission.

When the number of links connected between the electronic device 500 and the AP 320 is plural, the electronic device 500 may determine the latency of data transmission of each of the plurality of links. A method of determining the latency of data transmission of each of the plurality of links may be the same as a method of determining the latency of the first link 601.

The electronic device 500 may perform at least one operation, based on the latency in operation 1230.

The electronic device 500 may control a plurality of links including the first link 331, based on the determined latency.

The electronic device 500 may determine (or predict) the latency of each of the plurality of links between the AP 320 and the electronic device 500 as well as the first link 601. The electronic device 500 may determine the latency of each of the plurality of links and determine the latency of at least one link and a combination of two or more links among the plurality of links.

When determining the latency of the combination of two or more links, the electronic device 500 may determine a harmonic mean of the latency of links included in the combination of the links as the latency of the combination of the links. The harmonic mean of the latency of the links may mean a reciprocal number of the sum of reciprocal numbers of the latency of the links.

When a predetermined period or a predetermined event occurs, the electronic device 500 may determine (or predict) the latency of the second link 602 and/or the third link 603 and determine (or predict) the latency of the combination of the first link 601, the second link 602, and/or the third link 603. The predicted latency may be temporarily or non-temporarily stored in a memory (for example, the memory 130 of FIG. 1).

The electronic device 500 may identify the latency for performing the currently executed (or performed) service (or application). Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

The electronic device 500 may activate or deactivate at least some links among the plurality of links, based on the latency for performing the service and the latency of each of the plurality of links (or the combination of the plurality of links).

The electronic device 500 may maintain the link or the combination of the plurality of links that can implement the latency shorter than the latency for performing the service as the active state (or switch the same to the active state) and switch the remaining links to the inactive state (or maintain the same as the inactive state).

The electronic device 500 may control the communication circuit 510 to perform short-range wireless communication between the electronic device 500 and the external electronic device 401. For example, in a situation where the electronic device 500 performs a service (for example, data sharing, content sharing, or a service (for example, a second screen) using an element (for example, a display) of the external electronic device 401) by the external electronic device 401, the electronic device 500 may control the communication circuit 510 to perform short-range wireless communication between the electronic device 500 and the external electronic device 401.

The electronic device 500 may perform short-range wireless communication (for example, tunneled direct link setup (TDLS)) with the external electronic device 401 through the AP 320 or perform direct communication (device to device (D2D) (for example, Wi-Fi direct or neighbor awareness network (NAN)) without passing through passing through the AP 320.

The electronic device 500 may determine whether to perform short-range wireless communication through the AP 320 or perform direct communication between the external electronic device 401 and the electronic device 500, based on the latency of the link or the combination of links.

The electronic device 500 may identify the latency for performing the currently executed (or performed) service (or application). Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

The electronic device 500 may determine whether to perform short-range wireless communication through the AP 320 or perform direct communication between the external electronic device 401 and the electronic device 500, based on the latency for performing the service and latency of each of the plurality of links (or the combination of the plurality of links).

The electronic device 500 may determine to perform the direct communication between the external electronic device 401 and the electronic device 500, based on identification that there is no link or no combination of links which can implement the latency shorter than the latency for performing the service.

When the communication circuit 510 has capability to simultaneously make the connection between the AP 320 and the electronic device 500 and the connection between the external electronic device 401 and the electronic device 500, the electronic device 500 may configure direct communication between the external electronic device 401 and the electronic device 500 without releasing the connection between the AP 320 and the electronic device 500.

When the communication circuit 510 does not have capability to simultaneously make the connection between the AP 320 and the electronic device 500 and the connection between the external electronic device 401 and the electronic device 500, the electronic device 500 may release the connection between the AP 320 and the electronic device 500 and configure direct communication between the external electronic device 401 and the electronic device 500.

The electronic device 500 may perform short-range wireless communication through the AP 320, based on identification that there is the link or the combination of links that can implement the latency shorter than the latency for performing the service.

The electronic device 500 may determine whether to perform short-range wireless communication using another AP, which is not the AP 320, based on the latency of the link or the combination of links.

The electronic device 500 may identify the latency for performing the currently executed (or performed) service (or application). Alternatively, the electronic device 500 may identify the latency for performing the service, based on information on the currently executed service. For example, the electronic device 500 may identify the latency for performing the service, based on data to which information (or identification information) on the service stored in the memory 130 and the latency are mapped.

The electronic device 500 may determine whether to perform short-range wireless communication using another AP, which is not the AP 320, based on the latency for performing the service and the latency of each of the plurality of links (or the combination of the plurality of links).

The electronic device 500 may determine to perform short-range wireless communication using another AP which is not the AP 320 and perform a procedure for the connection with the other AP, based on identification that there is no link or no combination of links which can implement the latency shorter than the latency for performing the service.

The electronic device 500 may determine to perform short-range wireless communication using the AP 320 and maintain the connection with the AP 320, based on identification that there is the link or the combination of links that can implement latency shorter than the latency for performing the service.

An electronic device (for example, the electronic device 500 of FIG. 5) according to various embodiments of the disclosure may include a communication circuit (for example, the communication circuit 510 of FIG. 5) configured to transmit or receive data through a plurality of links including a first link generated between a first access point (AP) (for example, the first AP 1010 of FIG. 10A) and the electronic device 500. The electronic device 500 may include a processor (for example, the processor 520 of FIG. 5) operatively connected to the communication circuit 510. The processor 520 may be configured to determine a contention time corresponding to a waiting time for data transmission, based on a ratio between a time for subtracting counters to be allocated to the electronic device 500 in every predetermined unit and a time during which the first link exists in an idle state, and a predetermined number of the counters. The processor 520 may be configured to determine a latency for transmitting data through the first link, based on the contention time and a transmission time for transmitting the data and perform at least one operation, based on the latency.

In the electronic device 500 according to various embodiments of the disclosure, the processor 520 may be configured to identify a first time during which a state of the first link is monitored and a second time during which the first link is occupied by another electronic device (for example, the first electronic device 401 of FIG. 4A). The processor 520 may be configured to determine a contention time per unit time of the counters, based on the first time and the second time. The processor 520 may be configured to determine the contention time, based on the contention time per unit time of the counters and the predetermined number.

In the electronic device 500 according to various embodiments of the disclosure, the predetermined number may be an average number of timers allocated to the electronic device 500.

In the electronic device 500 according to various embodiments of the disclosure, the processor 520 may be configured to identify a first time during which a state of the first link is monitored and a third time corresponding to a time during which the first link exists in an idle state. The processor 520 may be configured to determine a contention time per unit time of the counters, based on the first time and the third time. The processor 520 may be configured to determine the contention time, based on the contention time per unit time of the counters and the predetermined number.

In the electronic device 500 according to various embodiments of the disclosure, the processor 520 may be configured to determine the latency, based on a success rate of the data transmission through the first link.

In the electronic device 500 according to various embodiments of the disclosure, the processor 520 may be configured to determine the transmission time, based on a type of a service being performed by the electronic device 500

In the electronic device 500 according to various embodiments of the disclosure, the processor 520 may be configured to activate or deactivate at least some links among the plurality of links, based on a latency of each of the plurality of links In the electronic device 500 according to various embodiments of the disclosure, the processor 520 may be configured to identify a latency for performing a service, based on information on the service being performed by the electronic device 500. The processor 520 may be configured to activate or deactivate at least some links among the plurality of links, based on the latency for performing the service and a latency of each of the plurality of links.

In the electronic device 500 according to various embodiments of the disclosure, the processor 520 may be configured to determine whether to transmit and/or receive data to and/or from another external electronic device (for example, the external electronic device 800 of FIG. 8) through the first AP 1010 or whether to transmit or receive data through device to device (D2D) communication between the another external electronic device 800 and the electronic device 500, based on a latency of each of the plurality of links.

In the electronic device 500 according to various embodiments of the disclosure, the processor 520 may be configured to identify a latency for performing a service, based on information on the service being performed by the electronic device 500. The processor 520 may be configured to release a connection between the first AP 1010 and the electronic device 500 and determine whether to make a connection between a second AP 1020 and the electronic device 500, based on the latency for performing the service and a latency of each of the plurality of links.

A method of operating an electronic device 500 according to various embodiments of the disclosure may include an operation of determining a contention time corresponding to a waiting time for data transmission, based on a ratio between a time for subtracting counters to be allocated to the electronic device 500 in every predetermined unit and a time during which a first link exists in an idle state, and a predetermined number of the counters. The method of operating the electronic device 500 may include an operation of determining a latency for transmitting data through the first link, based on the contention time and a transmission time for transmitting the data through the first link. The method of operating the electronic device 500 may include an operation of performing at least one operation, based on the latency.

In the method of operating the electronic device (for example, the electronic device 500 of FIG. 5) according to various embodiments of the disclosure may include an operation of identifying a first time during which a state of the first link is monitored and a second time during which the first link is occupied by another electronic device. The determining of the contention time may include an operation of determining a contention time per unit time of the counters, based on the first time and the second time. The determining of the contention time may include an operation of determining the contention time, based on the contention time per unit time of the counters and the predetermined number.

In the method of operating the electronic device 500 according to various embodiments of the disclosure, the predetermined number may be an average number of timers allocated to the electronic device 500.

In the method of operating the electronic device 500 according to various embodiments of the disclosure, the determining of the contention time may include an operation of identifying a first time during which a state of the first link is monitored and a third time corresponding to a time during which the first link exists in an idle state. The determining of the contention time may include determining a contention time per unit time of the counters, based on the first time and the third time. The determining of the contention time may include an operation of determining the contention time, based on the contention time per unit time of the counters and the predetermined number.

In the method of operating the electronic device 500 according to various embodiments of the disclosure, the operation of determining the latency may include an operation of determining the latency, based on a success rate of the data transmission through the first link.

The method of operating the electronic device 500 according to various embodiments of the disclosure may further include an operation of determining the transmission time, based on a type of a service being performed by the electronic device 500.

In the method of operating the electronic device 500 according to various embodiments of the disclosure, the operation of performing at least one operation, based on the latency may include an operation of activating or deactivating at least some links among the plurality of links, based on a latency of each of the plurality of links.

In the method of operating the electronic device 500 according to various embodiments of the disclosure, the operation of performing the at least one operation, based on the latency may include an operation of identifying the latency for performing a service, based on information on the service being performed by the electronic device 500. The operation of performing the at least one operation, based on the latency may include an operation of activating or deactivating at least some links among the plurality of links, based on a latency of each of the plurality of links.

In the method of operating the electronic device 500 according to various embodiments of the disclosure, the operation of performing the at least one operation, based on the latency may include an operation of determining whether to transmit and/or receive data to and/or from another external electronic device 800 through the first AP 1010 or whether to transmit or receive data through device to device (D2D) communication between the another external electronic device 800 and the electronic device 500, based on a latency of each of the plurality of links.

In the method of operating the electronic device 500 according to various embodiments of the disclosure, the operation of performing the at least one operation, based on the latency may include an operation of identifying the latency for performing a service, based on information on the service being performed by the electronic device 500. The operation of performing the at least one operation, based on the latency may include an operation of releasing a connection between the first AP 1010 and the electronic device 500 and an operation of determine whether to make a connection between a second AP 1020 and the electronic device 500, based on the latency for performing the service and a latency of each of the plurality of links.

An electronic device (for example, the electronic device 500 of FIG. 5) according to various embodiments of the disclosure may include a communication circuit (for example, the communication circuit 510 of FIG. 5) configured to transmit or receive data through a first link generated between a first access point (AP) (for example, the first AP 1010 of FIG. 10A) and the electronic device 500. The electronic device 500 may include a processor (for example, the processor 520 of FIG. 5) operatively connected to the communication circuit 510. The processor 520 may be configured to determine a contention time corresponding to a waiting time for data transmission, based on a ratio between a time for subtracting counters to be allocated to the electronic device 500 in every predetermined unit and a time during which the first link exists in an idle state, and a predetermined number of the counters. The processor 520 may be configured to determine a latency for transmitting data through the first link, based on the contention time and a transmission time for transmitting the data and perform at least one operation, based on the latency.

In the electronic device 500 according to various embodiments of the disclosure, the processor 520 may be configured to identify a first time during which a state of the first link is monitored and a second time during which the first link is occupied by another electronic device (for example, the first electronic device 401 of FIG. 4A). The processor 520 may be configured to determine a contention time per unit time of the counters, based on the first time and the second time. The processor 520 may be configured to determine the contention time, based on the contention time per unit time of the counters and the predetermined number.

In the electronic device 500 according to various embodiments of the disclosure, the predetermined number may be an average number of timers allocated to the electronic device 500.

In the electronic device 500 according to various embodiments of the disclosure, the processor 520 may be configured to determine whether to transmit and/or receive data to and/or from another external electronic device (for example, the external electronic device 800 of FIG. 8) through the first AP 1010 or whether to transmit or receive data through device to device (D2D) communication between the another external electronic device 800 and the electronic device 500, based on a latency of the first link.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a communication circuit configured to transmit or receive data through a plurality of links comprising a first link between a first access point (AP) and the electronic device;

at least one processor operatively connected to the communication circuit; and memory storing instructions that, when executed by the at least one processor, cause the at least one processor to:

determine a contention time corresponding to a waiting time for data transmission, based on a predetermined number of counters and a ratio between a time during which the first link exists in an idle state and a time for subtracting the counters allocated to the electronic device during one communication period;

determine a latency for transmitting data through the first link, based on the contention time and a transmission time for transmitting the data; and perform at least one operation, based on the latency.

2. The electronic device of claim 1, wherein the instructions further cause the at least one processor to:

determine a first time during which a state of the first link is monitored and a second time during which the first link is occupied by another electronic device;

determine a contention time per unit time of the counters, based on the first time and the second time; and determine the contention time, based on the contention time per unit time of the counters and the predetermined number.

3. The electronic device of claim 1, wherein the predetermined number is an average number of the counters allocated to the electronic device.

4. The electronic device of claim 1, wherein the instructions further cause the at least one processor to:

determine a first time during which a state of the first link is monitored and a third time corresponding to the time during which the first link exists in the idle state;

determine a contention time per unit time of the counters, based on the first time and the third time; and determine the contention time, based on the contention time per unit time of the counters and the predetermined number.

5. The electronic device of claim 1, wherein the instructions further cause the at least one processor to determine the latency, based on a success rate of data transmission through the first link.

6. The electronic device of claim 1, wherein the instructions further cause the at least one processor to determine the transmission time, based on a type of a service being performed by the electronic device.

7. The electronic device of claim 1, wherein the instructions further cause the at least one processor to activate or deactivate at least some links among the plurality of links, based on a link latency of each of the plurality of links.

8. The electronic device of claim 1, wherein the instructions further cause the at least one processor to:

determine a service latency for performing a service, based on information on the service being performed by the electronic device; and activate or deactivate at least some links among the plurality of links, based on the service latency and a link latency of each of the plurality of links.

9. The electronic device of claim 1, wherein the instructions further cause the at least one processor to determine whether to transmit and/or receive data to and/or from another external electronic device through the first AP or whether to transmit or receive data through device to device (D2D) communication between the another external electronic device and the electronic device, based on a link latency of each of the plurality of links.

10. The electronic device of claim 1, wherein the instructions further cause the at least one processor to:

determine a service latency for performing a service, based on information on the service being performed by the electronic device; and determine whether to release a connection between the first AP and the electronic device and make a connection between a second AP and the electronic device, based on the service latencyand a link latency of each of the plurality of links.

11. A method of operating an electronic device for transmitting and/or receiving data through a plurality of links comprising a first link, the method comprising:

determining a contention time corresponding to a waiting time for data transmission, based on a predetermined number of counters and a ratio between a time during which a first link exists in an idle state and a time for subtracting the counters allocated to the electronic device during one communication period;

determining a latency for transmitting data through the first link, based on the contention time and a transmission time for transmitting the data through the first link; and performing at least one operation, based on the latency.

12. The method of claim 11, wherein the determining of the contention time comprises:

determining a first time during which a state of the first link is monitored and a second time during which the first link is occupied by another electronic device;

determining a contention time per unit time of the counters, based on the first time and the second time; and determining the contention time, based on the contention time per unit time of the counters and the predetermined number.

13. The method of claim 11, wherein the predetermined number is an average number of the counters allocated to the electronic device.

14. The method of claim 11, wherein the determining of the contention time comprises:

determining a first time during which a state of the first link is monitored and a third time corresponding to the time during which the first link exists in the idle state;

determining a contention time per unit time of the counters, based on the first time and the third time; and determining the contention time, based on the unit contention time and the predetermined number.

15. The method of claim 11, wherein the determining of the latency comprises determining the latency, based on a success rate of the data transmission through the first link.

16. An electronic device comprising:

a communication circuit configured to transmit or receive data through a plurality of links comprising a first link;

at least one processor operatively connected to the communication circuit; and memory storing instructions that, when executed by the at least one processor, cause the at least one processor to:

determine a first time during which a state of the first link is monitored and a second time during which the first link is occupied by another electronic device;

determine an idle time of the first link by subtracting the second time from the first time;

determine a contention time corresponding to a waiting time for data transmission, based on a ratio between the idle time and a time for subtracting counters allocated to the electronic device during one slot;

determine a latency for transmitting data through the first link, based on the contention time and a transmission time for transmitting the data; and perform at least one operation, based on the latency.

17. The electronic device of claim 16, wherein the instructions further cause the at least one processor to:

determine the contention time, based on the ratio and a predetermined number of the counters.

18. The electronic device of claim 17, wherein the predetermined number is an average number of the counters allocated to the electronic device.

19. The electronic device of claim 16, wherein the instructions further cause the at least one processor to determine the latency, based on a success rate of data transmission through the first link.

20. The electronic device of claim 16, wherein the instructions further cause the at least one processor to determine the transmission time, based on a type of a service being performed by the electronic device.

* * * * *